US012569962B2

(12) United States Patent
Vandergon et al.

(10) Patent No.: US 12,569,962 B2
(45) Date of Patent: Mar. 10, 2026

(54) HIGH PRESSURE LIQUID-JET SEAL ASSEMBLY CARRIAGE

(71) Applicant: Hypertherm, Inc., Hanover, NH (US)

(72) Inventors: Cedar Vandergon, New Brighton, MN (US); James Farnsworth, Shoreview, MN (US)

(73) Assignee: Hypertherm, Inc., Hanover, NH (US)

( * ) Notice: Subject to any disclaimer, the term of this patent is extended or adjusted under 35 U.S.C. 154(b) by 1056 days.

(21) Appl. No.: 17/203,132

(22) Filed: Mar. 16, 2021

(65) Prior Publication Data

US 2021/0291332 A1     Sep. 23, 2021

Related U.S. Application Data

(60) Provisional application No. 62/990,857, filed on Mar. 17, 2020.

(51) Int. Cl.
*F16J 15/34* (2006.01)
*B24C 5/04* (2006.01)
*B25B 27/00* (2006.01)

(52) U.S. Cl.
CPC ............ *B25B 27/0028* (2013.01); *B24C 5/04* (2013.01); *F16J 15/3464* (2013.01)

(58) Field of Classification Search
CPC .......................... F16J 15/3464; B25B 27/0028
See application file for complete search history.

(56) References Cited

U.S. PATENT DOCUMENTS

| | | | | | |
|---|---|---|---|---|---|
| 3,947,944 | A | * | 4/1976 | Washington | F16J 15/36 277/370 |
| 4,026,005 | A | * | 5/1977 | Washington | F16J 15/36 29/469 |
| 5,503,404 | A | * | 4/1996 | Newton | B63H 23/321 277/551 |
| 5,668,426 | A | * | 9/1997 | Lamert | G01P 3/443 310/171 |
| 9,482,211 | B2 | * | 11/2016 | Chacko | B24C 7/0007 |

(Continued)

FOREIGN PATENT DOCUMENTS

| | | | | |
|---|---|---|---|---|
| EP | 2263033 A1 | 12/2010 | | |
| EP | 2876336 A1 | * 5/2015 | ......... | B25B 27/0028 |

OTHER PUBLICATIONS

European Patent Office Search Authority, International Search Report and Written Opinion mailed Sep. 6, 2021 for PCT International Patent Application No. PCT/US2021/022513, Applicant: Hypertherm, Inc., 17 pages.

*Primary Examiner* — Vishal A Patel
(74) *Attorney, Agent, or Firm* — Perkins Coie LLP

(57) ABSTRACT
A disposable seal carriage for use with a liquid jet cutting system can include a body having a first end portion, a longitudinal axis, and a second end portion opposite the first end portion along the longitudinal axis. The first end portion can have a first outer width as measured perpendicular to the longitudinal axis, the second end portion can have a second outer width as measured perpendicular to the longitudinal axis, and the first outer width can be greater than the second outer width. The seal carriage can further include a flexible region extending through at least a portion of the body along a portion of the longitudinal axis. In some embodiments, the body includes a plurality of exterior projections positioned between the first and second end portions.

18 Claims, 20 Drawing Sheets

(56) References Cited

U.S. PATENT DOCUMENTS

| | | | |
|---|---|---|---|
| 9,989,054 B2 | 6/2018 | Osterhouse et al. | |
| 9,993,934 B2 | 6/2018 | Vandergon et al. | |
| 10,151,311 B2 | 12/2018 | Chacko et al. | |
| 11,458,605 B2 * | 10/2022 | Horning | B25B 27/24 |
| 2007/0252340 A1 * | 11/2007 | Karl | F16J 15/28 |
| | | | 277/534 |
| 2008/0019851 A1 | 1/2008 | Hopkins et al. | |
| 2015/0252801 A1 | 9/2015 | Osterhouse et al. | |

* cited by examiner

710 Releasably mount an O-ring about a seal carriage

720 Releasably mount a seal about the seal carriage

730 Releasably mount a hoop ring about the seal carriage

740 Releasably mount a backup ring at least partially about the seal carriage

700

810

Connect a seal carriage having at least one of an O-ring, a seal, a hoop ring, and a backup ring to a tool

820

Actuate the tool to displace at least one of the O-ring, the seal, the hoop ring, and the backup ring relative to the seal carriage and onto the plunger

800

HIGH PRESSURE LIQUID-JET SEAL ASSEMBLY CARRIAGE

CROSS-REFERENCE TO RELATED APPLICATIONS INCORPORATED BY REFERENCE

The present application claims priority to U.S. Provisional App. No. 62/990,857, titled HIGH PRESSURE LIQUID-JET SEAL ASSEMBLY CARRIAGE, which was filed on Mar. 17, 2020, and is incorporated herein by reference in its entirety.

TECHNICAL FIELD

The present disclosure is generally related to a seal carriage for use with a liquid jet cutting system, and associated systems and methods.

BACKGROUND

Liquid jet cutting systems generally include high-pressure seal assemblies having one or more seal components. Such seal assemblies often have a short operating life (e.g., about 300 hours), creating the need to frequently replace these components. Replacement and/or failure of these seals are common reasons for system downtime, and can involve lengthy and complicated processes. For example, in some instances replacing a high-pressure seal assembly can involve replacing multiple components, such as a high-pressure seal, a high-pressure seal O-ring, a hoop, and a backup ring. These components must be installed in a specific order and/or orientation relative to one another in order to ensure proper operation and to avoid premature failure. Additionally, these components can be deformed or damaged when shipped to an end user. Furthermore, some installation processes require application of a precise amount of high-vacuum grease to the O-ring. Controlling the amount of grease applied can have a significant effect on the proper operation and life of the high-pressure seal assembly. Accordingly, there is a need for improved systems and methods for providing and replacing seal assemblies for liquid jet cutting systems.

DETAILED DESCRIPTION

The following disclosure describes various embodiments of a seal carriage for liquid jet cutting systems. The seal carriage can generally include a body having a first end portion, a longitudinal axis, and a second end portion opposite the first end portion along the longitudinal axis. The first end portion can have a first outer width as measured perpendicular to the longitudinal axis, the second end portion can have a second outer width as measured perpendicular to the longitudinal axis, and the first outer width is greater than the second outer width. The seal carriage can further include a flexible region extending through at least a portion of the body along a portion of the longitudinal axis. In some embodiments, the seal carriage can further include a plurality of exterior projections positioned between the first and second end portions. The seal carriage can releasably receive one or more components of a seal for a liquid jet cutting system. The one or more components can be positioned about a portion of the seal carriage in a pre-determined order, such that the seal carriage can be used to transport, ship, install, etc. the components. This can advantageously reduce the risk of damage to the one or more components during transportation, and/or reduce the error rate of a seal installation process.

In the Figures, identical reference numbers identify identical, or at least generally similar, elements. To facilitate the discussion of any particular element, the most significant digit or digits of any reference number refers to the Figure in which that element is first introduced. For example, element 240 is first introduced and discussed with reference to FIG. 2.

Figure 1A:
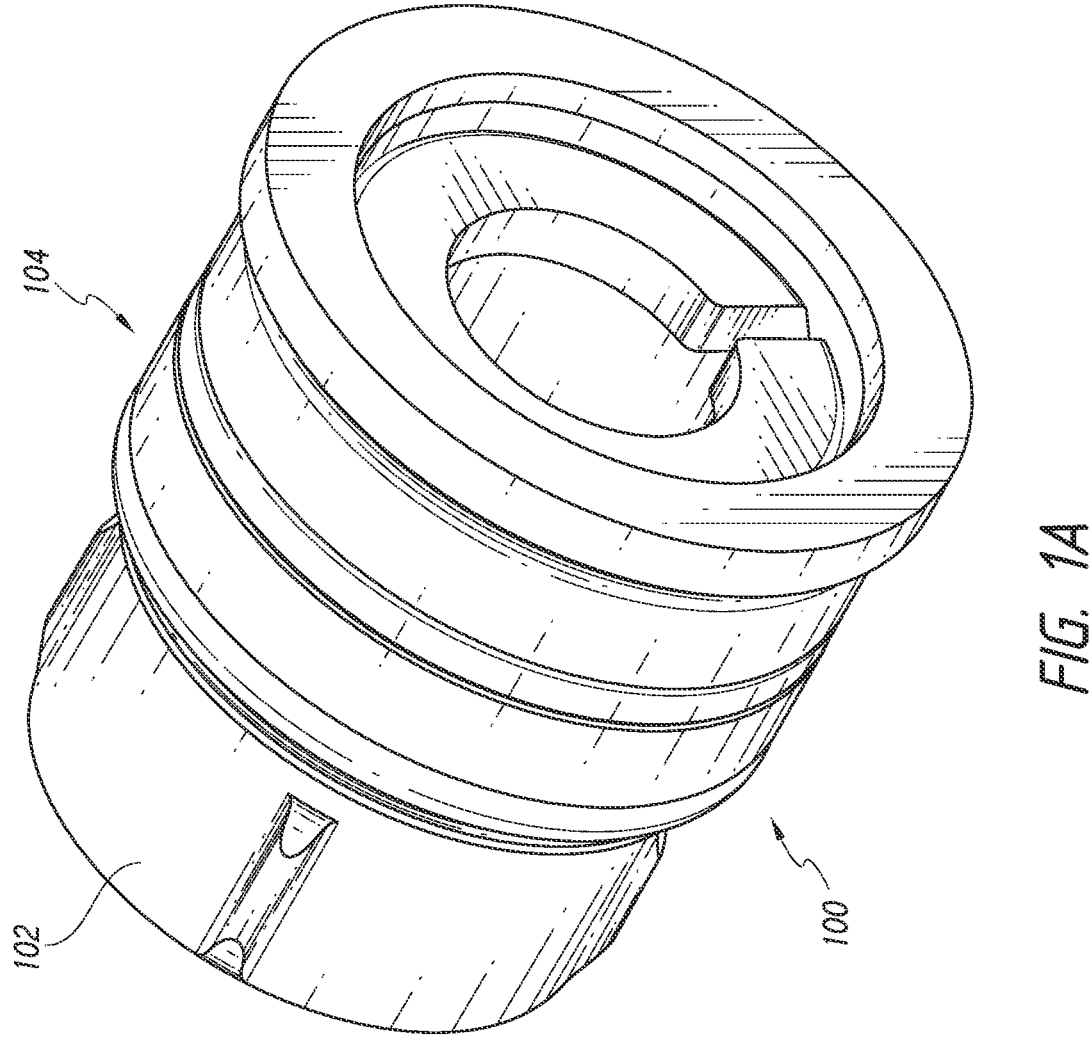
FIG. 1A is a perspective view of a seal carriage assembly, configured in accordance with embodiments of the present technology.

FIG. 1A is a perspective view of the seal carriage assembly 100. As illustrated, the seal carriage assembly 100 can include a seal carriage 102 and a seal assembly 104 disposed about the seal carriage 102. The seal carriage 102 can be formed from any suitable material, including plastics, metals, composites, or a combination thereof. For example, in some embodiments, the seal carriage 102 can be formed from injection-molded plastics (e.g., ABS, polycarbonates, nylon, etc.) or other suitable materials or combinations of materials. The seal assembly 104 can include one or more components from a seal for use with a liquid jet cutting system, such as a the Echion 15, Echion 30, and Echion 50 waterjet pumps manufactured by Hypertherm, Inc. The seal assembly 104 can be mounted on the seal carriage 102. For example, the seal assembly 104 can be positioned at least partially around a portion of the seal carriage 102.

Figure 1B:
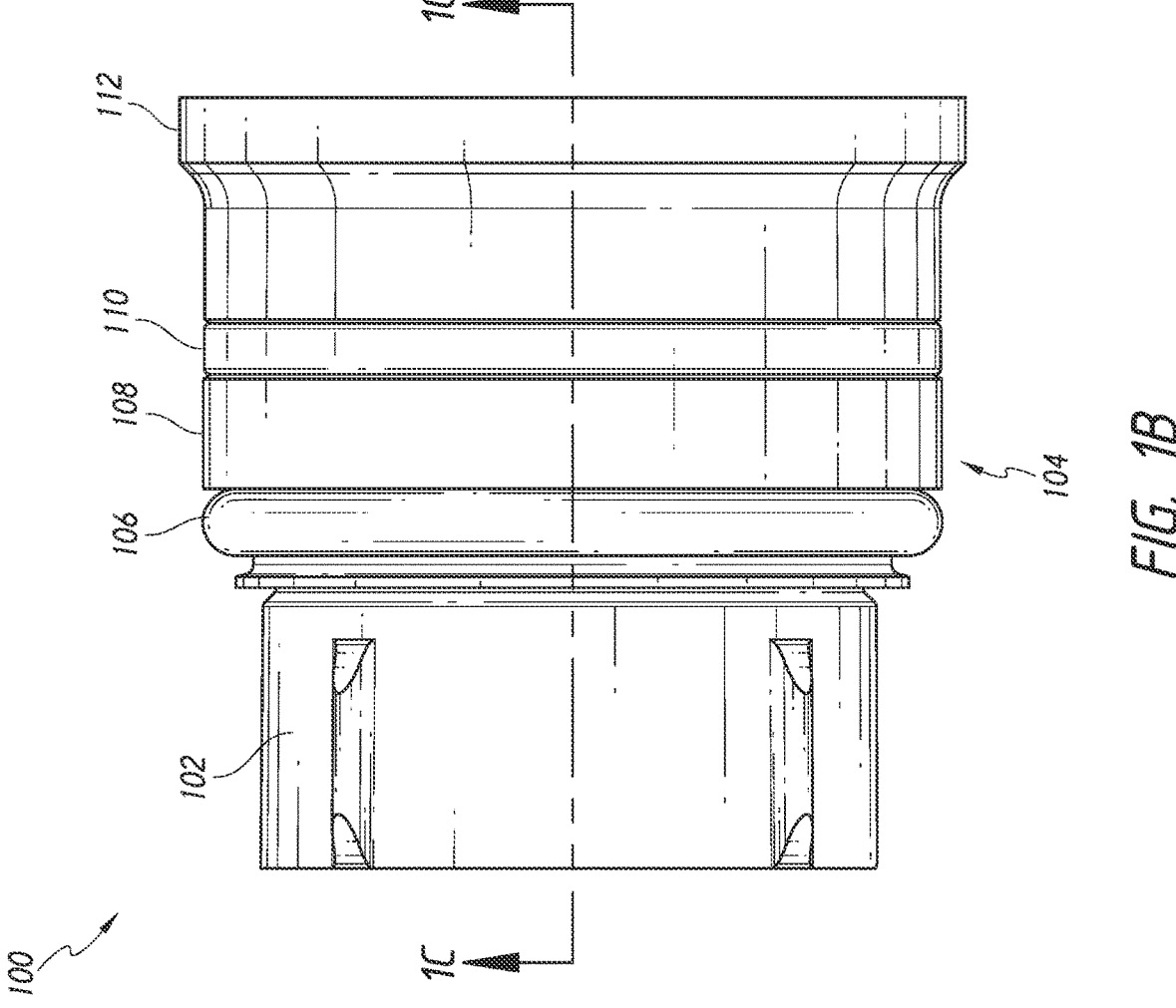
FIG. 1B is a side elevation view of the seal carriage assembly of FIG. 1A.

FIG. 1B is a side elevational view of the seal carriage assembly 102. As illustrated, the seal assembly 104 can include an O-ring 106, a high-pressure seal 108, a hoop ring 110, and/or a backup ring 112. Each of the O-ring 106, high-pressure seal 108, hoop ring 110, and backup ring 112 can be positioned at least partially around the seal carriage 102, as discussed previously.

Figure 1C:
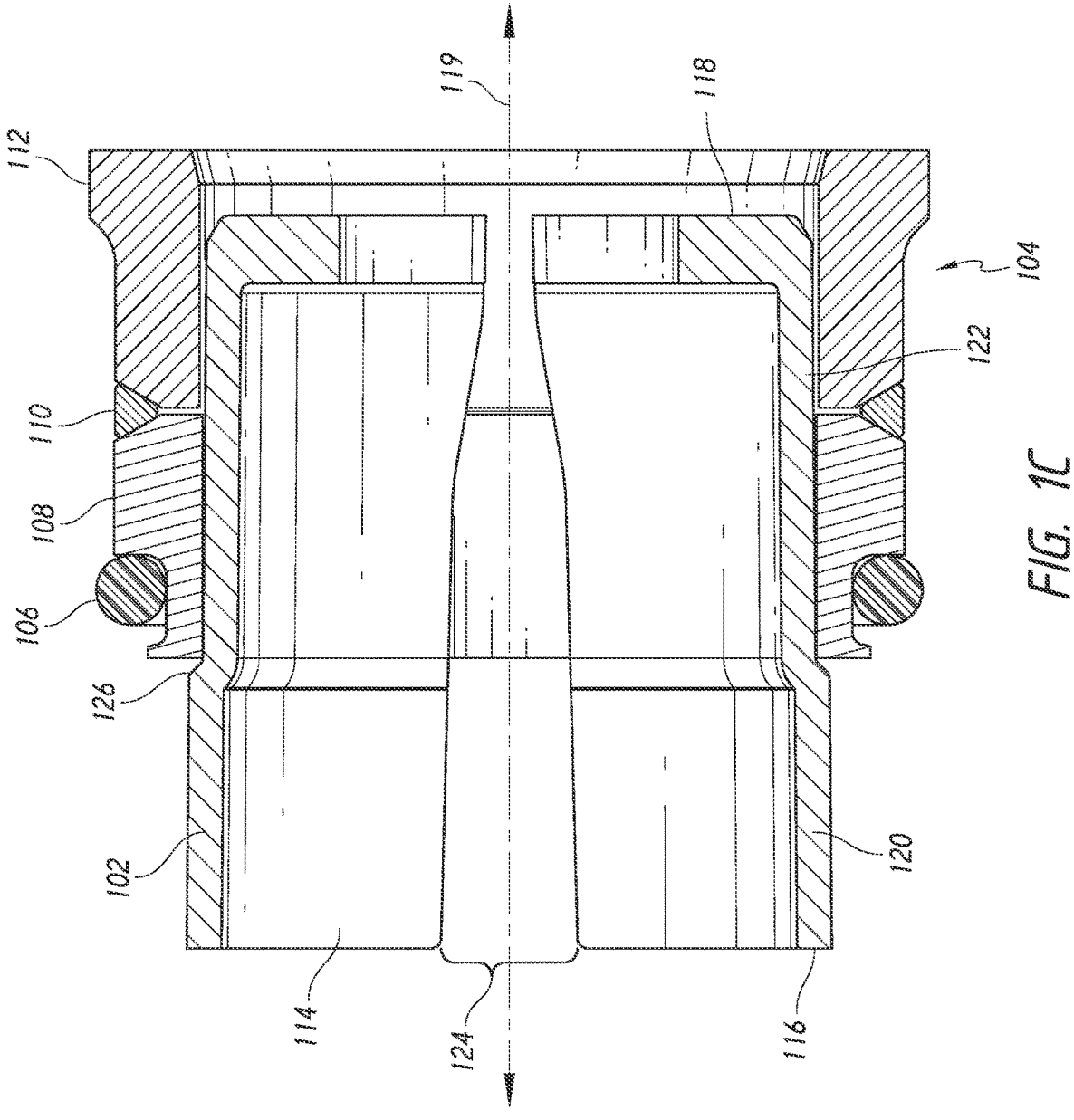
FIG. 1C is a cross-sectional view of the seal carriage assembly of FIG. 1A, taken along the cut-plane 1C-1C of FIG. 1B.

FIG. 1C is a cross-sectional view of the seal carriage assembly 100, taken along the cut-plane 1C-1C of FIG. 1B. As illustrated, the seal carriage 102 can include a body 114 having a first end portion 120 (e.g., a first portion), a second end portion 122 (e.g., a second portion) opposite the first end portion 120, and a longitudinal axis 119 extending therebetween. The body 114 can include a first end 116 and a second end 118 opposite the first end 116. The first end portion 120 can be between the first end 116 and the second end portion 122, and the second end portion 122 can between the first end portion 120 and the second end 118.

In some embodiments, the first and second end portions 120, 122 can have a same cross-sectional shape, including any of the cross-sectional shapes discussed below with respect to FIG. 2B. In other embodiments, the first and second end portions 120, 122 can have different cross-sectional shapes. For example, the first end portion 120 can have a first cross-sectional shape corresponding to the shape of an installation tool (not shown—discussed in greater detail with respect to FIGS. 3A-3C), and the second end portion 122 can have a second cross-sectional shape different from the first and configured to correspond to the internal cross-sectional shape of the seal assembly 104. Accordingly, the first end 116 and/or the first end portion 120 can be configured to releasably couple (e.g., receive, mate, attach, etc.) with an installation tool (not shown), and the second end 118 and/or the second end portion 122 can be configured to releasably couple with the seal assembly 104. Sizing and shaping the second end portion 122 to correspond with internal dimensions of the seal assembly 104 can allow the seal carriage 102 to structurally support the seal assembly 104 during shipment and prior installation to reduce the likelihood of warping, stressing, or other failures of the seal assembly 104 prior to installation. Contacting/supporting the seal assembly 104 on an inner surface of the seal assembly 104 can also reduce the risk of those components buckling prior to installation.

With further reference to FIG. 1C, the seal carriage 102 can include a flexible or deformable region 124. The deformable region 124 can extend through at least a portion, a majority, or an entirety of the body 114 between the first end 116 and the second end 118. The deformable region 124 can be generally aligned (e.g., parallel) with the longitudinal axis 119 of the seal carriage 102. In the illustrated embodiment, the deformable region 124 extends from the first end 116 to the second end 118. In other embodiments, the deformable region 124 extends only partially through a length of the body 114 of the seal carriage 102 between and/or through the first and/or second end portions 120, 122. For example, the deformable region 124 can begin at the second end 118 and extend between 25%-50%, between 30%-75%, and/or between 45%-90% of the length of the body 114. In some embodiments, the deformable region 124 extends from the first end 116 to between 25%-50%, between 30%-75%, and/or between 45%-90% of the length of the body 114.

The deformable region 124 can allow for circumferential and/or radial compression of the body 114 relative to the longitudinal axis 119. For example, at least part of the first and/or second end portions 120, 122 can be compressed to allow for one or more components of the seal assembly 104 to be positioned about the seal carriage 102.

The body 114 can include an abutment 126 positioned between the first and second ends 116, 118. The abutment 126 can be configured to inhibit or prevent longitudinal motion of the seal assembly 104 relative to the body 114 when the seal assembly 104 is positioned about the seal carriage 102. For example, the abutment 126 can at least partially contact the high-pressure seal 108 to prevent the high-pressure seal 108 from moving towards the first end 116 past the abutment 126.

In some embodiments, the seal carriage 102 is configured to receive the seal assembly 104 in a predetermined configuration. For example, the high-pressure seal 108 can be positioned closest to the first end 116 and/or contacting the abutment 126, the backup ring 112 can be positioned at least partially between the high-pressure seal 108 and the second end 118, the hoop ring 110 can be positioned at least partially between the high-pressure seal 108 and the backup ring 112, and the O-ring can surround at least a portion of the high-pressure seal 108. Receiving the seal assembly 104 in a predetermined configuration can reduce the risk of incorrect installation, and costs associated therewith. For example, for seal assemblies 104 that need to be installed in a predetermined order, the seal carriage 102 can be used to provide (e.g., ship, transport, align, position, etc.) the seal assembly 104 to end users together in said predetermined order.

In some embodiments, the backup ring 112 can be matingly engaged and/or connected to at least a portion of the second end portion 122; the hoop ring 110 can be positioned between the first end portion 120 and the backup ring 112; the high pressure seal 108 can be matingly engaged and/or connected to at least a portion of the seal carriage 102 between the first end portion 120 and the hoop ring 110; and the O-ring 106 can be matingly engaged and/or connected to at least a portion of the high-pressure seal 108 and/or about the seal carriage 102.

Figure 1D:
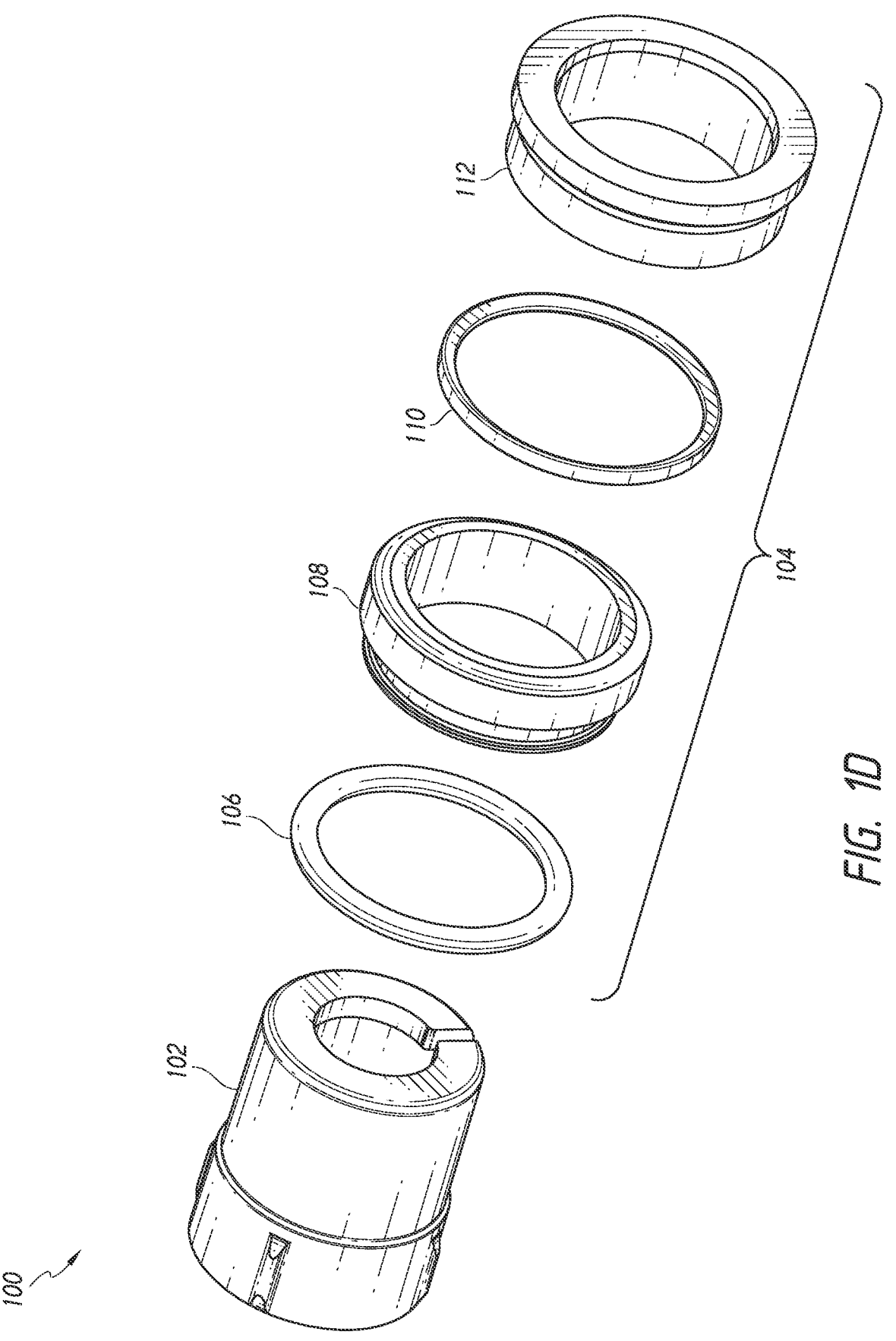
FIG. 1D is an exploded perspective view of the seal carriage assembly of FIG. 1A.

FIG. 1D is an exploded view of the seal carriage assembly 100. As illustrated, the seal carriage 102 can be configured to releasably receive the seal assembly 104. The seal carriage assembly 100 can be used for transportation, assembly, and/or installation of the seal assembly 104. For example, the seal assembly 104 can be displaced relative to the seal carriage 102 such that the seal assembly 104 can be installed in a liquid jet cutting system. This is discussed in greater detail with respect to FIGS. 3A-3C.

Figures 2A, 2B:
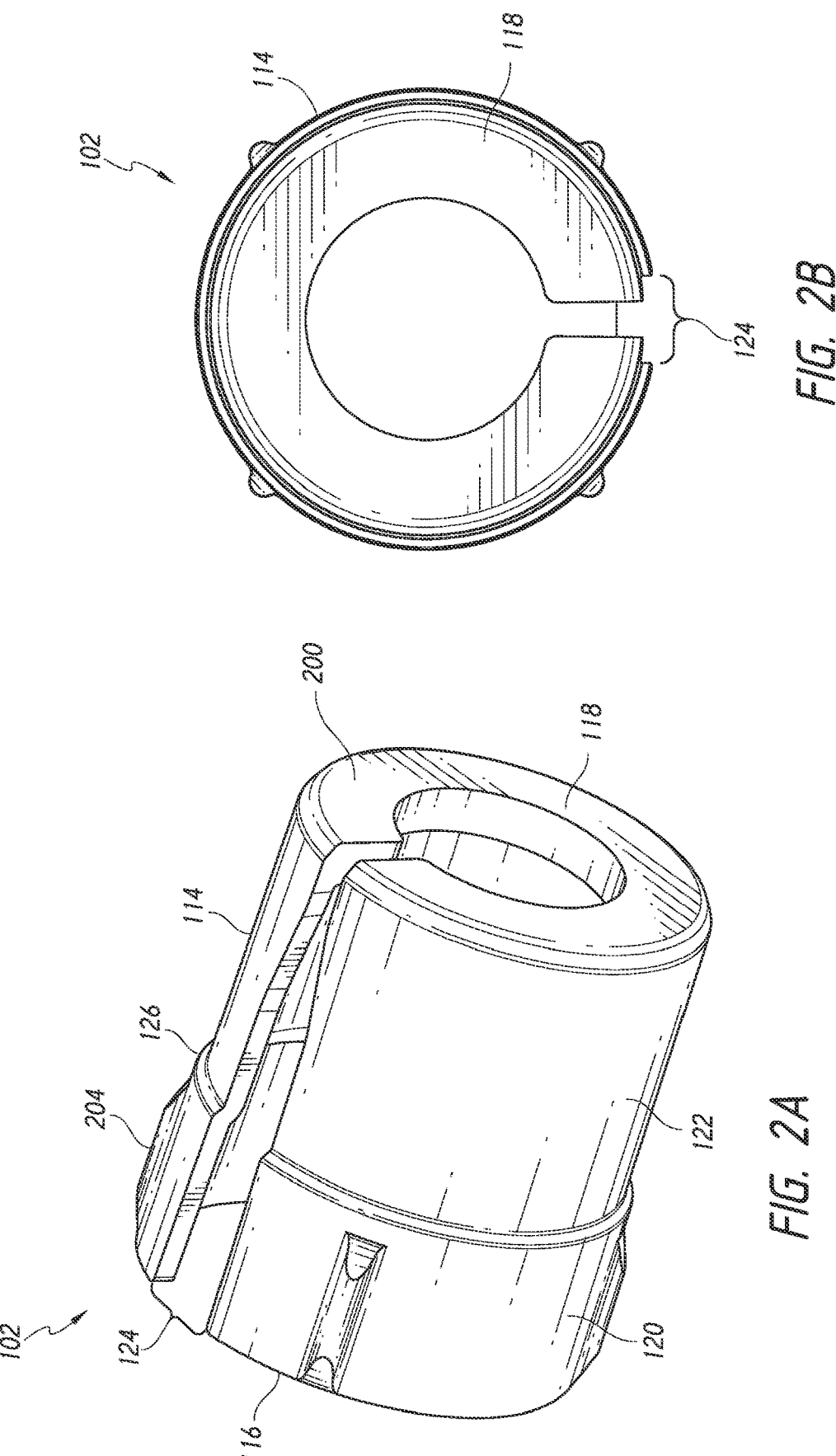
FIG. 2A is a perspective view of a seal carriage, configured in accordance with embodiments of the present technology.
FIG. 2B is a front elevation view of the seal carriage of FIG. 2A.

FIG. 2A is a perspective view of the seal carriage 102. As illustrated, the second end portion 122 and/or the second end 118 can include a flange 200. The flange 200 can extend inwardly (e.g., circumferentially, radially, etc.) toward the longitudinal axis 119 of the seal carriage 102. The flange 200 can at least partially increase the stiffness (e.g., the radially and/or circumferential stiffness) of the second end portion 122. For example, the region of the second end portion 122 that includes the flange 200 can have a greater stiffness than the region of the second end portion 122 that does not include the flange 200.

In some embodiments, the deformable region 124 extends through at least a portion of the flange 200. In some such configurations, the flange 200 can be compressed (e.g., radially, circumferentially, etc.) relative to the longitudinal axis 119. The flange 200 can have a constant radial thickness (e.g., with respect to the longitudinal axis 119) along an entire perimeter of the flange 200. In some embodiments, the radial thickness of the flange 200 varies along the perimeter of the flange 200.

With continued reference to FIG. 2A, the abutment 126 can be a step in an outer surface of the body 114 and positioned between the first and second end portions 120, 122. The step 126 can be configured to contact one or more seal components, such as the components of the seal assembly 104 of FIGS. 1A-1D. For example, the step 126 can be configured to contact the high-pressure seal 108 of FIGS. 1A-1D. In some embodiments, the abutment 126 can include one or more radial protrusions extending from an outer surface of the first end portion 120. For example, the first and second end portions 120, 122 can have similar or identical diameters and/or widths and the one or more radial protrusions can inhibit or prevent movement of the seal assembly 104 (FIG. 1C) past the protrusions.

The first end portion 120 of the seal carriage 102 can include exterior projections or tabs 204. In some embodiments, the tabs 204 are elongate and can be generally parallel to the longitudinal axis 119, and can extend radially from the outer surface of the first end portion 120. The tabs 204 can be configured to interface with an installation tool (FIG. 3A) during an installation process, as discussed in greater detail below with respect to FIGS. 3A-3C.

FIG. 2B is a front view of the seal carriage 102. As illustrated, the seal carriage 102 can have a generally circular cross-sectional shape. In other embodiments, the seal carriage 102 can have a generally triangular, square, pentagonal, hexagonal, or any other suitable cross-sectional shape. In some embodiments the cross-sectional shape of the seal carriage 102 can correspond to the cross-sectional shape of the seal assembly 104 and/or of an installation tool for use with the seal carriage 102.

Figure 2D:
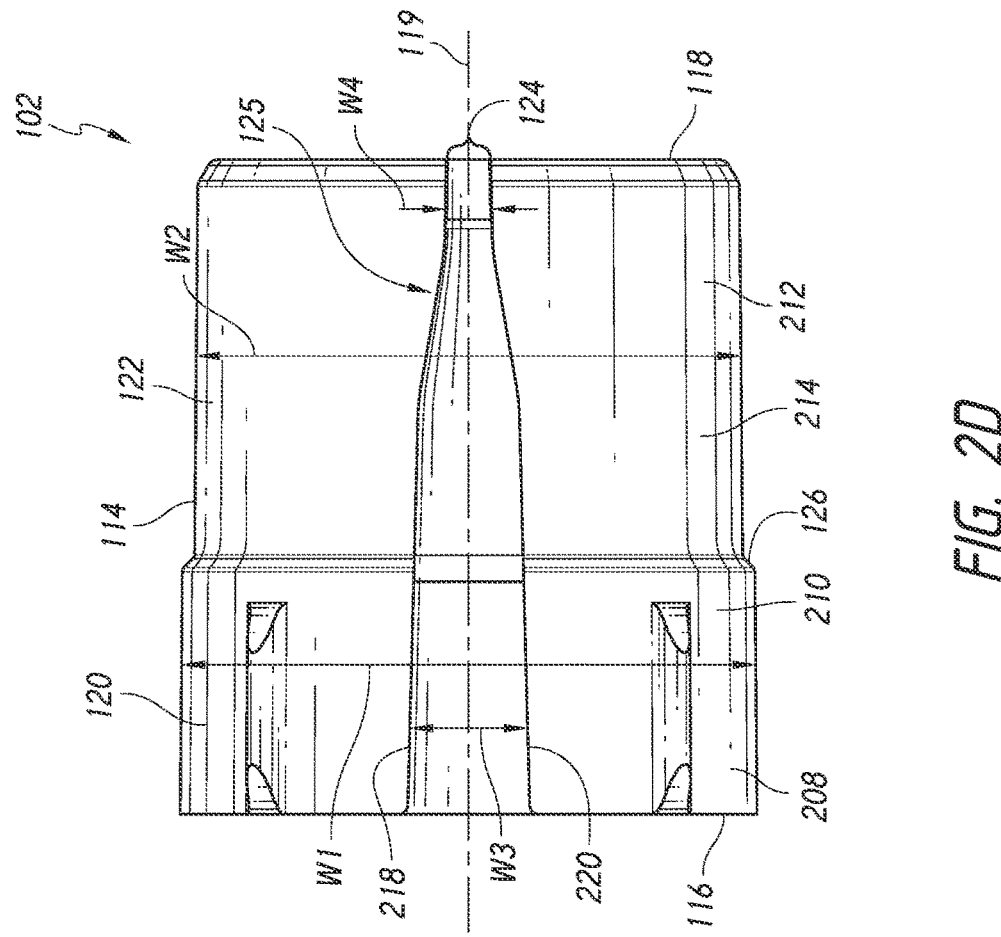
FIG. 2D is a top plan view of the seal carriage of FIG. 2A.
Figure 2C:
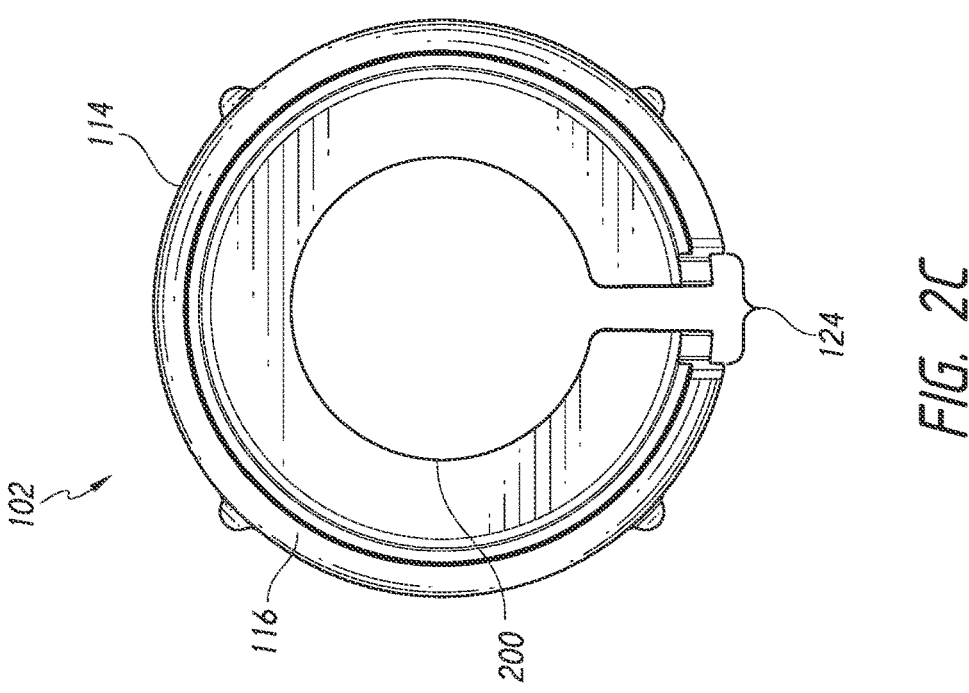
FIG. 2C is a rear elevation view of the seal carriage of FIG. 2A.

Referring to FIGS. 2A-2C, at least a portion of the body 114 of the seal carriage 102 can be hollow. In the illustrated embodiment the body 114 is hollow from the first end 116 to the second end 118. In other embodiments, the body 114 is hollow through only a portion of the first and/or second end portions 120, 122. Utilizing a hollow, or at least partially hollow body 114 can allow the body 114 to be compressed (e.g., circumferentially, radially, etc.) relative to the longitudinal axis 119. For example, the portions of the body 114 that are compressible can correspond to the portions of the body 114 that are hollow. Additionally, hollowing the body 114 can reduce the weight and/or manufacturing costs of the seal carriage 102.

FIG. 2D is a side view of the seal carriage 102. As illustrated, the first end portion 120 can have a first outer width W1 relative to the longitudinal axis 119, and the second end portion 122 can have a second outer width W2 relative to the longitudinal axis 119. The second outer width W2 can be less than the first outer width W1. In some embodiments, the outer width of the body 114 increases relative to the longitudinal axis 119 from the second end 118 towards the first end 116. This change in outer width can define a taper of the body 114. For example, the body 114 includes an outward (e.g., widening, increasing, expanding, etc.) taper from the second end portion 122 towards the first end portion 120. The taper can at least partially correspond to a change in stiffness (e.g., compressibility) along the body 114 relative to the longitudinal axis. For example, as the outer width of the body 114 increases from the second end 118 towards the first end 116, the stiffness can decrease from the second end portion 122 towards the first end portion 120. In some embodiments, the first end portion 120 has a constant outer width W1 from the abutment 126 to the first end 116. The second end portion 122 can have a constant outer width W2 from the abutment 126 to the second end 118.

The first end portion 120 can have a first stiffness (e.g., first radial stiffness as measured perpendicular to the longitudinal axis 119), and the second end portion 122 can have a second stiffness (e.g., second radial stiffness as measured perpendicular to the longitudinal axis 119). The second stiffness can be greater than the first stiffness, such that the stiffness (e.g., compressibility) of the body 114 decreases from the second end 118 towards the first end 116.

As illustrated in FIG. 2D, the first end portion 120 can include a first region 208 and a second region 210 positioned between the first region 208 and the abutment 126. The first region 208 of the first end portion can have a first radial stiffness (e.g., relative to the longitudinal axis 119), and the second region 210 can have a second radial stiffness. The second radial stiffness can be greater than the first radial stiffness such that the stiffness of the first end portion 120 decreases from the step 126 towards the first end 116. In some embodiments, the first region 208 can have a lowered stiffness such that the first region 208 is the most deformable region along the length of the seal carriage 102.

The second end portion 122 can include a first region 212 and a second region 214 positioned between the first region 212 and the abutment 126. The first region 212 can have a first radial width (e.g., relative to the longitudinal axis 119) and the second region 214 can have a second radial width. The radial widths of the first and second regions 212, 214 can vary based on whether any seal components, such as the seal assembly 104 of FIGS. 1A-1D, are releasably attached to the second end portion 122. For example, the first radial width (e.g., of first region 212) can be greater than the second radial width (e.g., of second region 214) when one or more seal components are releasably attached to the second end portion 122, and the first radial width can be generally equal to the second radial width when one or more seal components are released from the second end portion 122. In some embodiments, the radial width of the second end portion 122 increases linearly from the first region 212 towards the second region 214 to correspond with the taper of the second end portion 122 and/or the body 114.

With continued reference to FIG. 2D, the deformable region 124 can comprise various structures, materials, and/or geometries depending on the specific application. For example, in some embodiments, the deformable region 124 is a portion of the body 114 that has a reduced thickness measured perpendicular to the longitudinal axis 119. In other embodiments, the deformable region 124 can be a portion of the body 114 formed from a different (e.g., more flexible, deformable, compressible, compliant) material. In the illustrated embodiment, the deformable region 124 is configured as a slot extending through a portion of the body 114 of the seal carriage 102. The slot 124 is generally aligned with (e.g., parallel to) the longitudinal axis 119.

The slot 124 can be defined by a first lateral boundary 218 and a second lateral boundary 220 facing the first lateral boundary 218. The second lateral boundary 220 can mirror the first lateral boundary 218 about a plane on which the longitudinal axis 119 lies. The first lateral boundary 218 can have a first slope relative to the plane, and the second lateral boundary 220 can have a second slope mirroring the first slope. The first and/or second slope can be linear, nonlinear, curvilinear, zig-zag, stepped, or any other suitable configuration relative to the plane.

The slot 124 can further include a first width W3 between the first and second lateral boundaries 218, 220 at the first end portion 120 and a second width W4 between the first and second lateral boundaries 218, 220 at the second end portion 122. The first and second widths W3, W4 of the slot 124 can be selected based on the desired stiffness of the body 114. For example, the first width W3 (e.g., at first end portion 120) can be greater than the second width W4 (e.g., at second end portion 122) such that the first end portion 120 can be less stiff than the second end portion 122. In some embodiments, the slot 124 includes a tapered portion 125 that transitions between the first width W3 and the second width W4. The tapered portion 125 can be located at least partially in the second end portion 122. The radial stiffness of the second end portion 122 can decrease as the width of the slot 124 increases along the tapered portion 125. In some such embodiments, the radial and/or circumferential stiffness of the second end portion 122 decreases from the second end 118 toward the abutment 126. For example, the second region 214 of the second end portion 122 can have a lower radial/circumferential stiffness than the first region 212 of the second end portion 122. This variance in stiffness can permit the second region 214 to radially compress more than first region 212 when the seal assembly 104 is coupled with the seal carriage 102. Increased radial compression of the first region 212 compared to the second region 214 can reduce stress on the high-pressure seal 108 (FIG. 1C) and/or can decrease the likelihood that components of the seal assembly 104 inadvertently slide off the second end portion 122. Reducing stress on the high-pressure seal 108 can reduce the chance of stretching or otherwise deforming the high-pressure seal 108 prior to installation.

The seal carriage 102 can be shaped to be molded in a two-piece injection mold. For example, the seal carriage 102 can be shaped such that the carriage does not have any negative drafts and/or does not have any zero-draft regions.

Figure 3A:
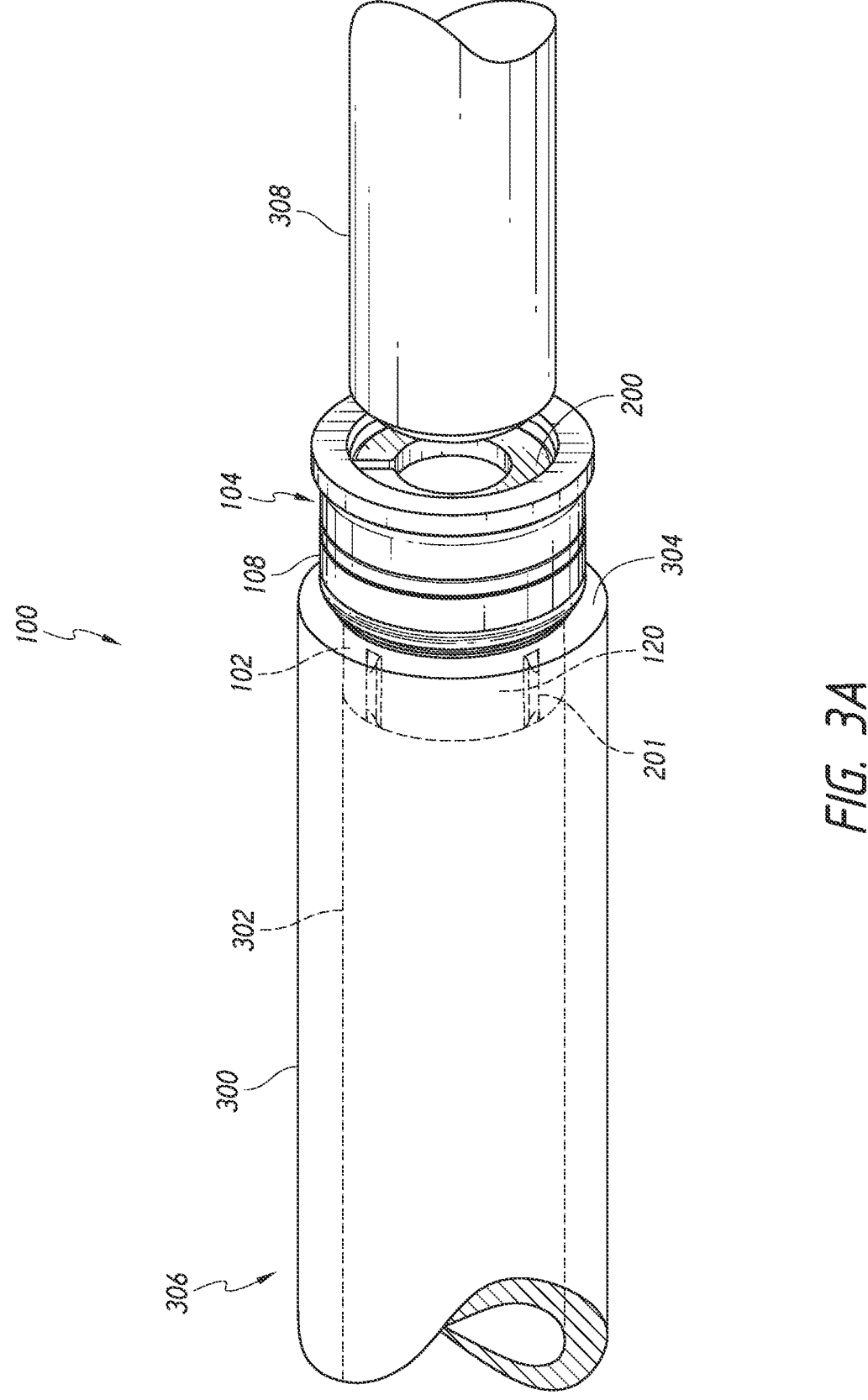
FIG. 3A illustrates the seal carriage assembly of FIG. 1A engaged with an installation tool prior to installing the seal carriage assembly on a plunger, in accordance with embodiments of the present technology.
Figure 3B:
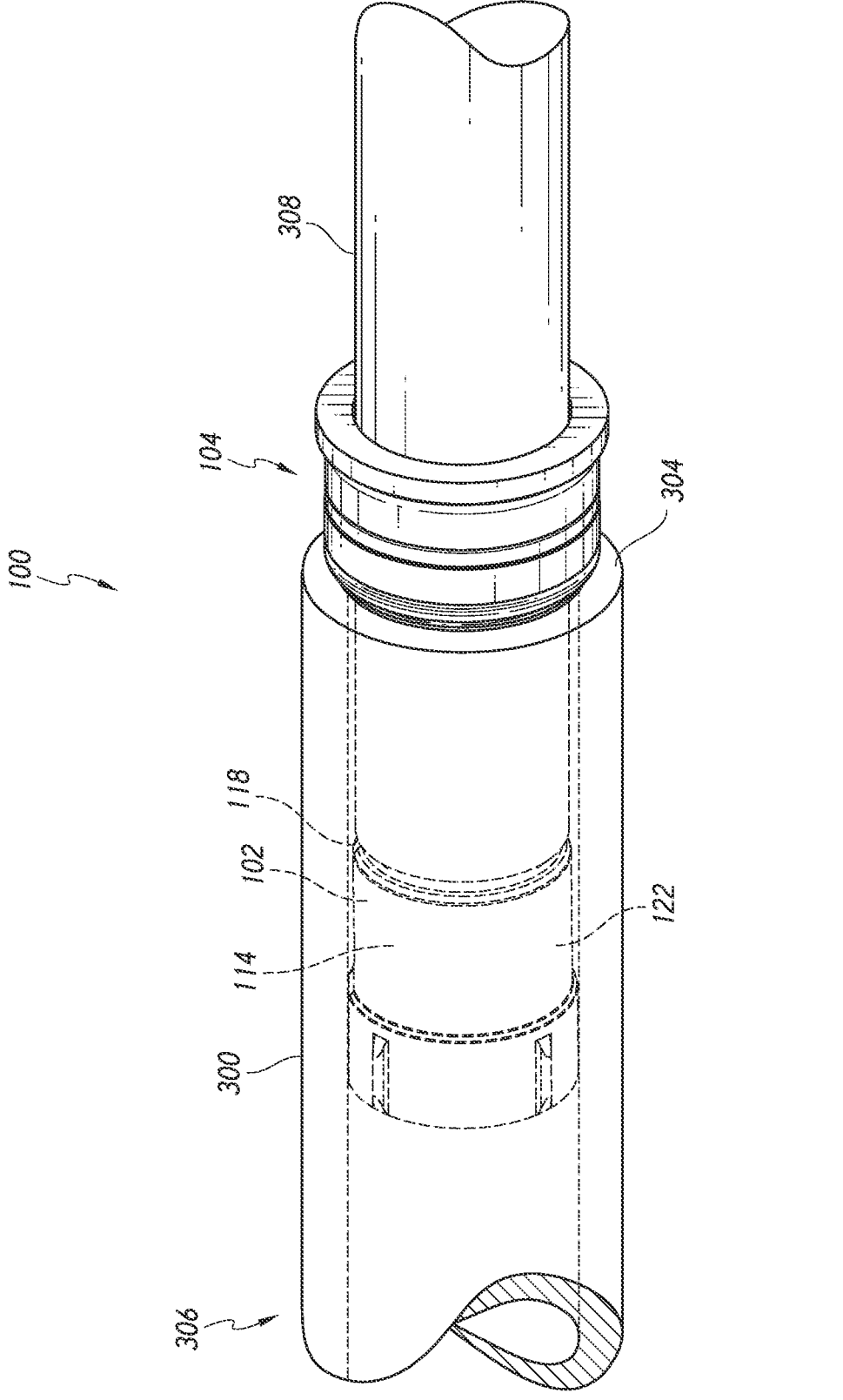
FIG. 3B illustrates the seal carriage assembly and installation tool of FIG. 3A after seal components of the seal carriage assembly are installed on the plunger.
Figure 3C:
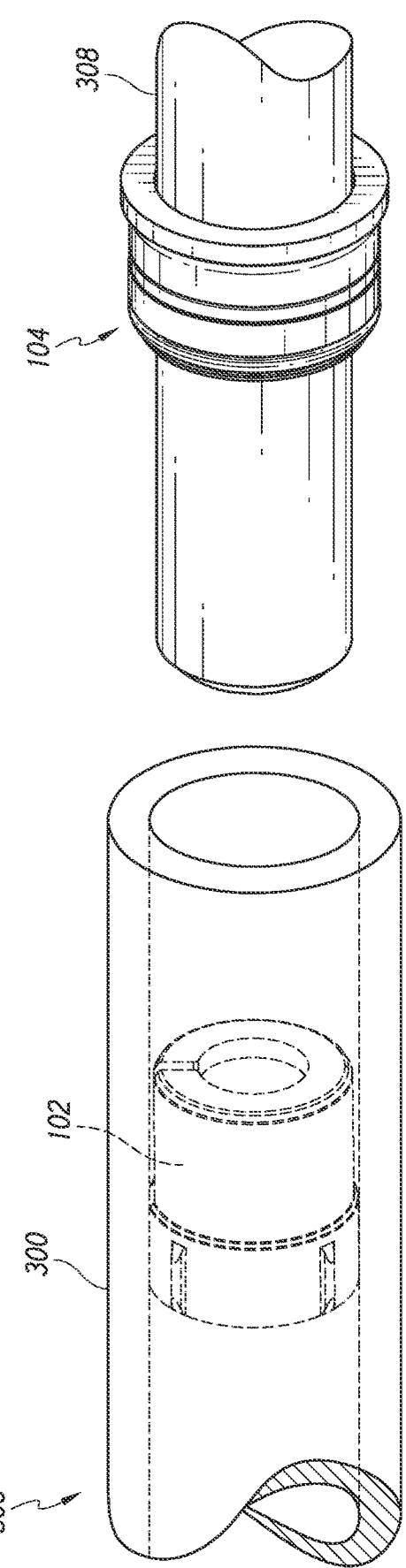
FIG. 3C illustrates the seal carriage assembly and installation tool of FIG. 3A after seal components of the seal carriage assembly are installed on the plunger and the installation tool is removed from the plunger.

FIGS. 3A-3C illustrate various stages of a method of using the seal carriage assembly 100 of FIGS. 1A-1D, in accordance with embodiments of the present technology. Referring to FIG. 3A, the method includes coupling the seal carriage assembly 100 with an installation tool 300. This coupling can include, for example, positioning the seal carriage assembly 100 at least partially within the installation tool 300. The installation tool 300 can have an internal cross-sectional shape that complements, matches, or otherwise corresponds to the cross-sectional shape of the seal carriage assembly 100 and/or first end portion 120 of the seal carriage 102, as discussed previously with respect to FIG. 1A.

The first end portion 120 and/or one or more tabs 204 of the seal carriage 102 can at least partially contact an interior surface 302 of the installation tool 300. The tabs 204 can inhibit or prevent the seal carriage 102 from sticking to the installation tool 300, as the tabs 204 reduce the contact surface area between the seal carriage 102 and the installation tool 300. In some embodiments, the first end portion 120 includes surface treatments (e.g., roughening, lubricants, textures, etc.) configured to reduce friction between the seal carriage 102 and the installation tool 300. These surface treatments can be used instead of or in addition to the tabs 204.

In some embodiments, one or more components of the seal assembly 104 (e.g., the high-pressure seal 108) can at least partially contact a distal end surface 304 of the installation tool 300 when the seal carriage 102 is inserted into the installation tool 300. The interaction between the seal assembly 104 and the distal end surface 304 can inhibit or prevent the seal components from moving longitudinally (e.g., towards a proximal end portion 306 of the installation tool 300) relative to the installation tool 300.

The method can further include aligning the seal carriage 102 with a plunger 308 of a liquid jet cutting system. The plunger 308 can have a cross-sectional shape corresponding to the cross-sectional shape of the seal assembly 104, such that the seal assembly 104 slides onto and surrounds a portion of the plunger 308. Similarly, the plunger 308 can have an outer width measured perpendicular to a longitudinal axis of the plunger 308 less than an inner width of the installation tool 300, such that at least part of the plunger 308 can be insertably received by the installation tool 300.

Referring to FIG. 3B, the method can include actuating the installation tool 300 relative to the plunger 308 to displace the seal assembly 104 relative to the seal carriage 102. The plunger 308 can contact the second end 118 to move the seal carriage 102 towards the proximal end portion 306 of the installation tool 300. The interaction between the distal end surface 304 and the seal assembly 104 can prevent the seal assembly 104 from moving proximally (e.g., toward the proximal end portion 306 of the installation tool 300). This can cause the seal assembly 104 to release from the second end portion 122 of the seal carriage 102 onto a portion of the plunger 308. Releasing the seal assembly 104 in an assembled arrangement from the seal carriage 102 can reduce the risk that the seal assembly 104 is improperly arranged (e.g., in the wrong order or orientation) on the plunger 308 after installation.

Referring to FIG. 3C, the method can include removing the installation tool 300 from the plunger 308. This can involve, for example, pulling the installation tool 300 off of the plunger 308. The seal assembly 104 can remain in position on the plunger 308 as the installation tool 300 and seal carriage 102 are removed from the plunger 308.

In some embodiments, the seal carriage 102 and/or the installation tool 300 can be disposable (e.g., sacrificial, single-use, consumable, etc.). In other embodiments, the seal carriage 102 and/or the installation tool 300 can be reusable, such that the seal carriage 102 can be removed from the installation tool 300 and the seal carriage 102 and/or the installation tool 300 can be reused. In some embodiments, the seal carriage 102 is completely removed/disconnected from the liquid jet cutting system prior to operation of the liquid jet cutting system.

Figure 4A:
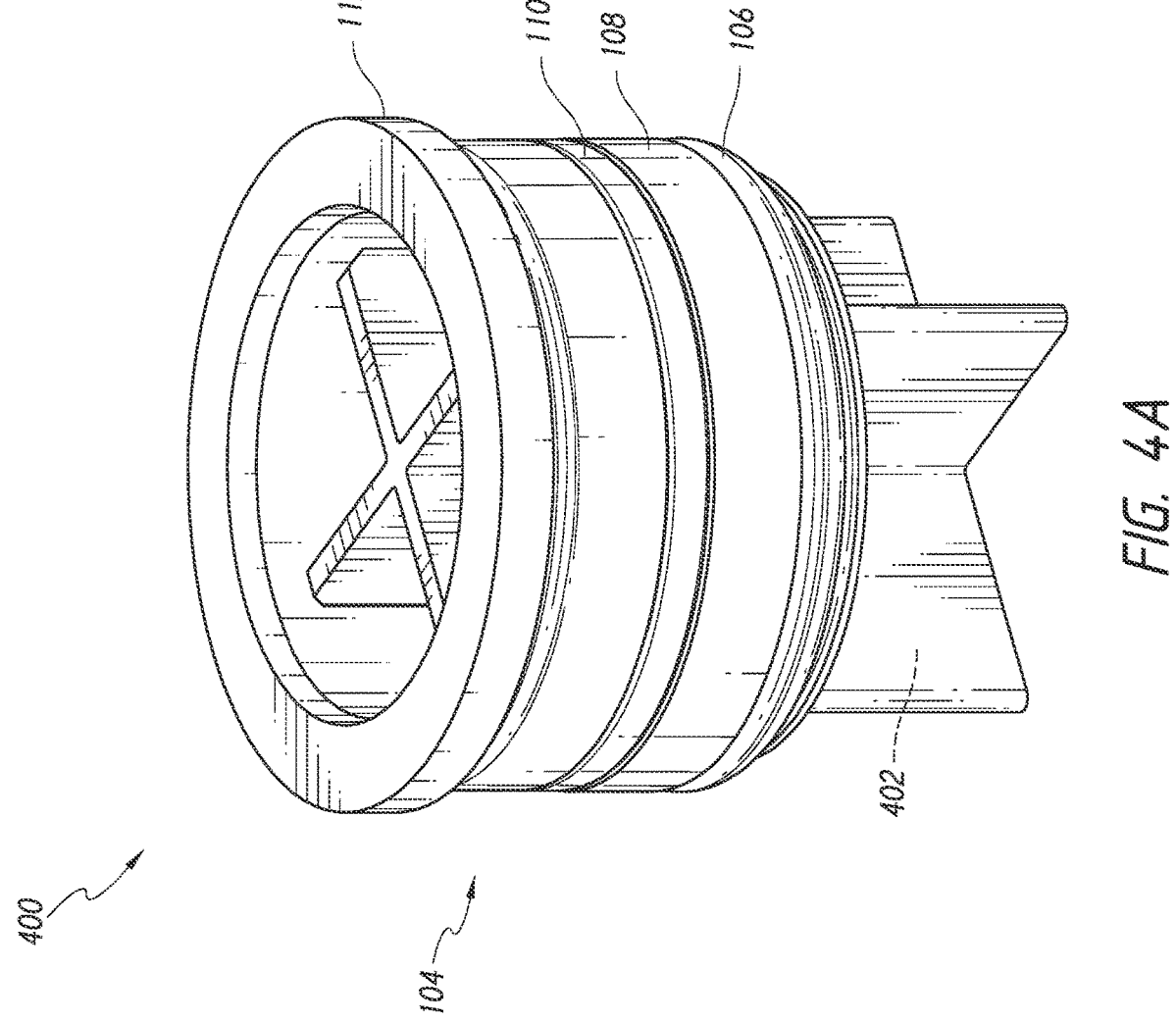
FIG. 4A is a perspective view of another seal carriage assembly, configured in accordance with embodiments of the present technology.
Figure 4C:
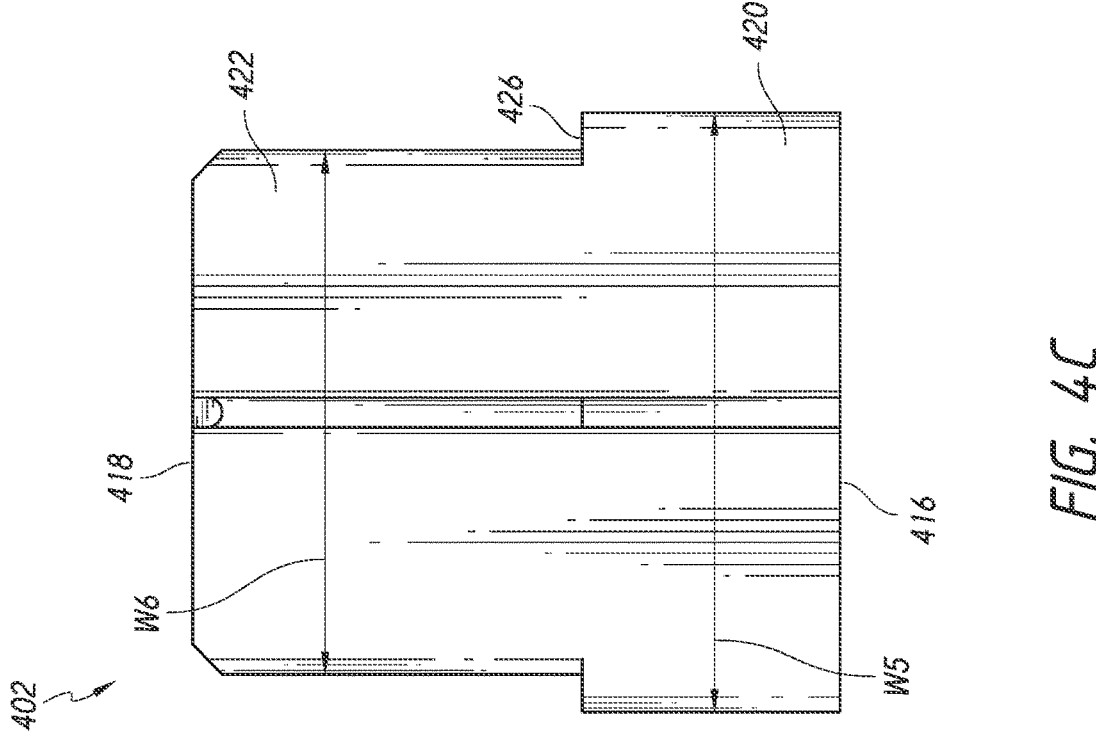
FIG. 4C is a side elevation view of the seal carriage of FIG. 4B.
Figure 4B:
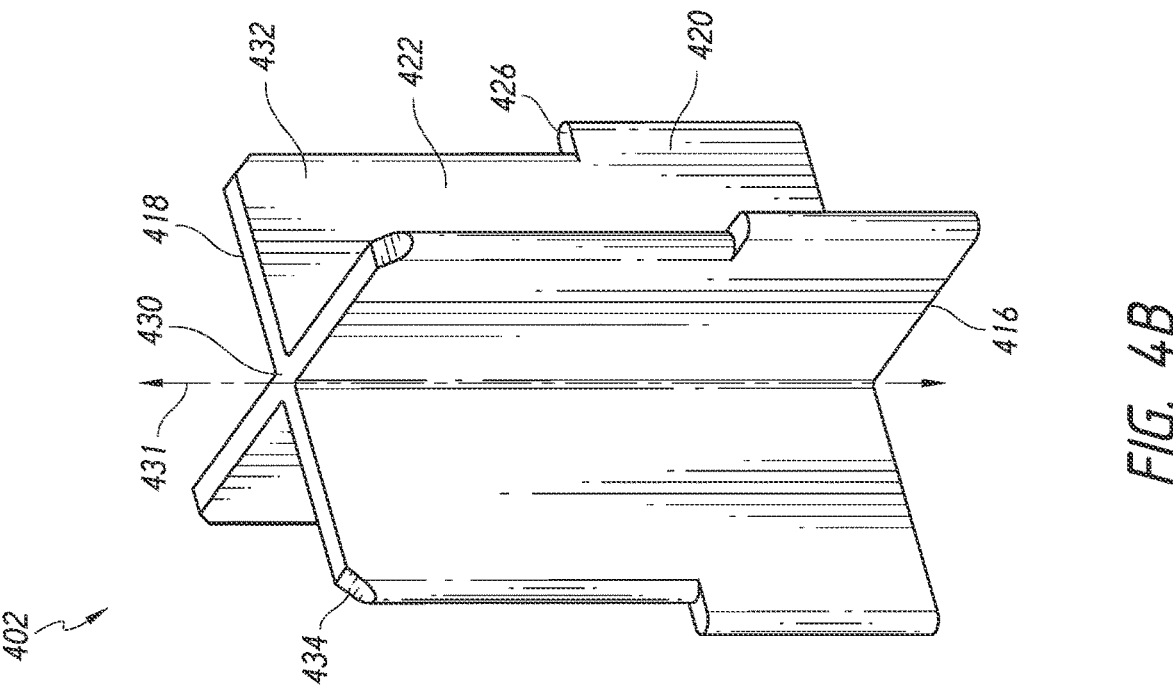
FIG. 4B is a perspective view of the seal carriage of the seal carriage assembly of FIG. 4A, configured in accordance with embodiments of the present technology.

FIGS. 4A-4C illustrate various views of a seal carriage assembly 400, configured in accordance with embodiments of the present technology. The components of the seal carriage assembly 400 in FIGS. 4A-4C can be generally similar to the components of the seal carriage assembly 100 of FIGS. 1A-1D. Accordingly, like numbers (e.g., abutment 426 v. abutment 126) are used to identify similar or identical components, and the discussion of the seal carriage assembly 400 of FIGS. 4A-4C will be limited to those features that differ from the seal carriage assembly 100 of FIGS. 1A-1D. Additionally, any of the features of the seal carriage assembly 400 of FIGS. 4A-4C can be combined with each other and/or with the seal carriage assembly 100 of FIGS. 1A-1D.

Similarly, the components of the seal carriage 402 in FIGS. 4A-4C can be generally similar to the components of the seal carriage 102 of FIGS. 1A-2D. Accordingly, like numbers (e.g., first end portion 420 versus first end portion 120) are used to identify similar or identical components, and the discussion of the seal carriage 402 of FIGS. 4A-4C will be limited to those features that differ from the seal assembly 102 of FIGS. 1A-2D. Additionally, any of the features of the seal carriage 402 of FIGS. 4A-4C can be combined with each other and/or with the seal carriage 102 of FIGS. 1A-2D.

FIG. 4A is a perspective view of the seal carriage assembly 400. The seal carriage assembly 400 can include a seal assembly 104 releasably received by the seal carriage 402. In some embodiments, the seal assembly 104 can include an O-ring 106, a high-pressure seal 108, a hoop ring 110, and a backup ring 112.

FIG. 4B is a perspective view of the seal carriage 402 of FIG. 4A. The seal carriage 402 can include a central portion 430 coincident with a longitudinal axis 431 of the seal carriage 402, and a plurality of arms 432 extending radially outward therefrom with respect to the longitudinal axis 431. Each of the arms 432 can be configured to contact (e.g., support, brace, interface) one or more seal components (not shown), such as the seal assembly 104 of FIG. 4A.

The seal carriage 402 can further include a first end portion 420 and a second end portion 422. The first end portion 420 can include portions of the arms 432 between the first end 416 of the seal carriage 402 and an abutment 426 of the seal carriage 402. The second end portion 422 can include portions of the arms 432 between the abutment 426 and the second end 418 of the seal carriage 402. The second end portion 422 can be configured to releasably receive one or more seal components, such as the seal assembly 104 of FIG. 4A. In some embodiments, the second end portion 422 of each of the arms 432 can include a chamfer or bevel 434 at or near the second end 418 of the seal carriage 402. The bevels 434 can help guide the one or more components of the seal assembly 104 onto the second end portion 422 during assembly.

The abutment 426 can be positioned between the first and second end portions 420, 422. The abutment 426 can be configured to contact one or more components of the seal assembly 104, to inhibit or prevent movement of the one or more components of the seal assembly 104 past the abutment 426 towards the first end 416 of the seal carriage 402. For example, in the illustrated embodiment, the abutment 426 is a step on one or more of the arms 432 that at least partially contacts the high-pressure seal 108 of FIG. 4A.

FIG. 4C is a side view of the seal carriage 402. As illustrated, the first end portion 420 can have a first outer width W5, the second end portion 422 can have a second outer width W6, and the first outer width W5 can be greater than the second outer width W6. The first outer width W5 can be sized to match or substantially match an inner width of an installation tool (e.g., the installation tool 300 described above). The second outer width W6 can be sized to match or substantially match an inner width of one or more of components of the seal assembly 104.

The seal carriage 402 can be configured to operate with the installation tool 300 in a manner similar to or the same as the methods described above with respect to FIGS. 3A-3C, wherein like components (e.g., first end portion 420 and first end portion 120) of the respective seal carriages 102, 402 operate in similar or identical manners. In some embodiments, one or more of the arms 432 are configured to flex when the seal assembly 104 is positioned thereon. For example, one or more of the arms 432 can bend in a direction tangential to the longitudinal axis 431 when the seal assembly 104 is positioned on the second end portion 422 of the seal carriage 402.

Figure 5A:
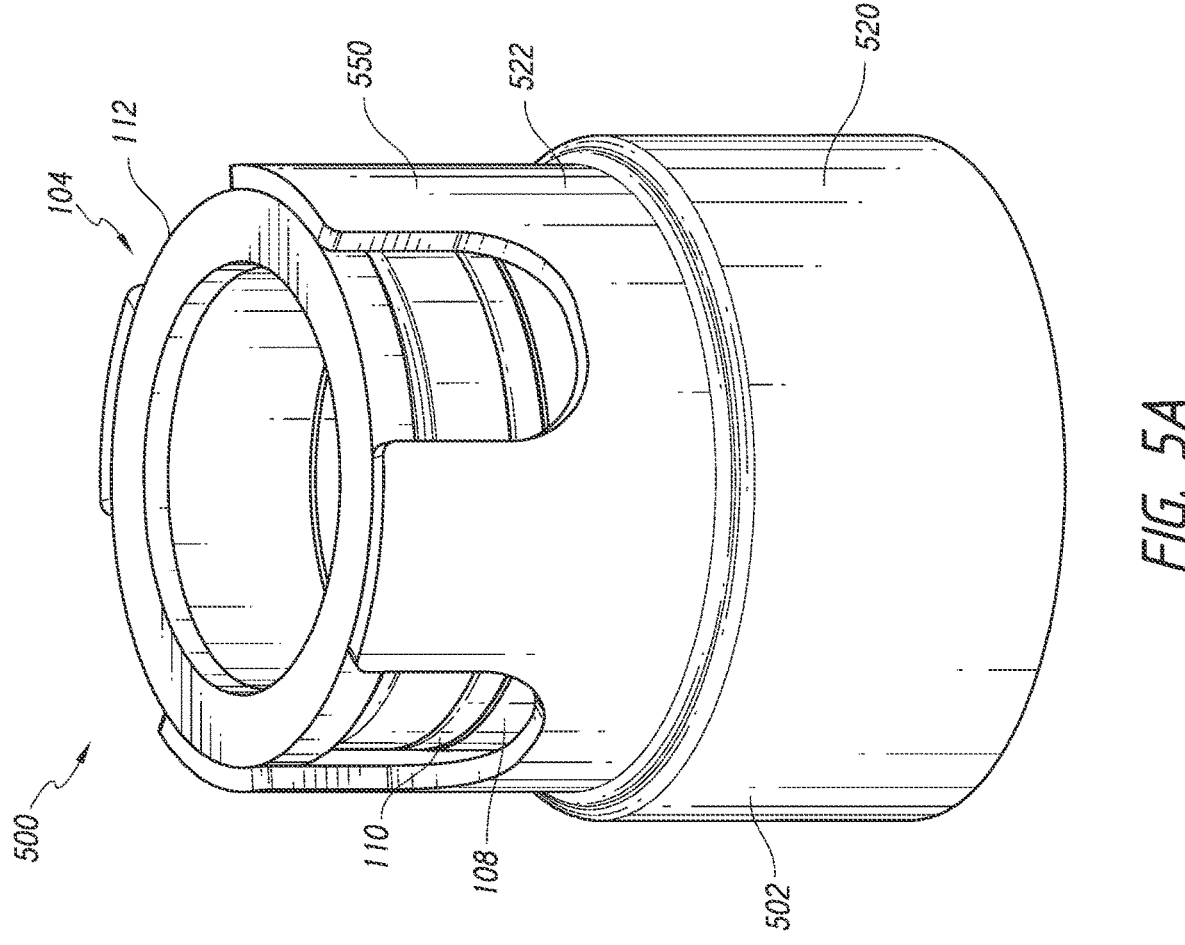
FIG. 5A is a perspective view of yet another seal carriage assembly, configured in accordance with embodiments of the present technology.

FIG. 5A illustrates a seal assembly 500 configured in accordance with embodiments of the present technology. The seal assembly 500 can include a seal carriage 502 that can at least partially contain (e.g., surround, encompass, encircle, etc.) one or more of components of the seal assembly 104. A first end portion 520 of the seal carriage 502 can correspond to a tool, such as the installation tool 300 of FIGS. 3A-3C, such that the first end portion 520 can be releasably coupled to the tool.

A second end portion 522 of the seal carriage 502 can include a plurality of arms 550. One or more of the arms 550 can contact one or more components of the seal assembly 104 to inhibit or prevent the seal assembly 104 from moving radially relative to a longitudinal axis of the seal carriage 502. For example, in the illustrated embodiment each of the arms 550 contact the backup ring 112. In some embodiments, at least one of the arms 550 can be inwardly biased (e.g., towards the longitudinal axis of the seal carriage 502) such that positioning one or more of the components of the seal assembly 104 within the seal carriage 502 can at least partially counteract the inward bias of the at least one arm 550 and secure one or more components of the seal assembly 104 relative to the seal carriage 502. In some embodiments, a diameter or width of one or more of the components of the seal assembly 104 (e.g., the backup ring 112) is greater than a width W7 (FIG. 5D) of the second end portion 522 such that insertion of the seal assembly 104 into the second end portion 522 causes the arms 550 to flex away from the longitudinal axis of the seal carriage 502. The flexed arms 550 can create a friction fit between the second end portion 522 and the seal assembly 104 to reduce the likelihood of accidental decoupling of the seal assembly 104 from the seal carriage 502. While illustrated as having four arms 550 in FIG. 5A, in other embodiments the seal carriage 502 can include more or fewer arms. For example, the seal carriage 502 can have two, three, five, six, seven, eight, nine, ten, or any other suitable number of arms 550.

Figure 5B:
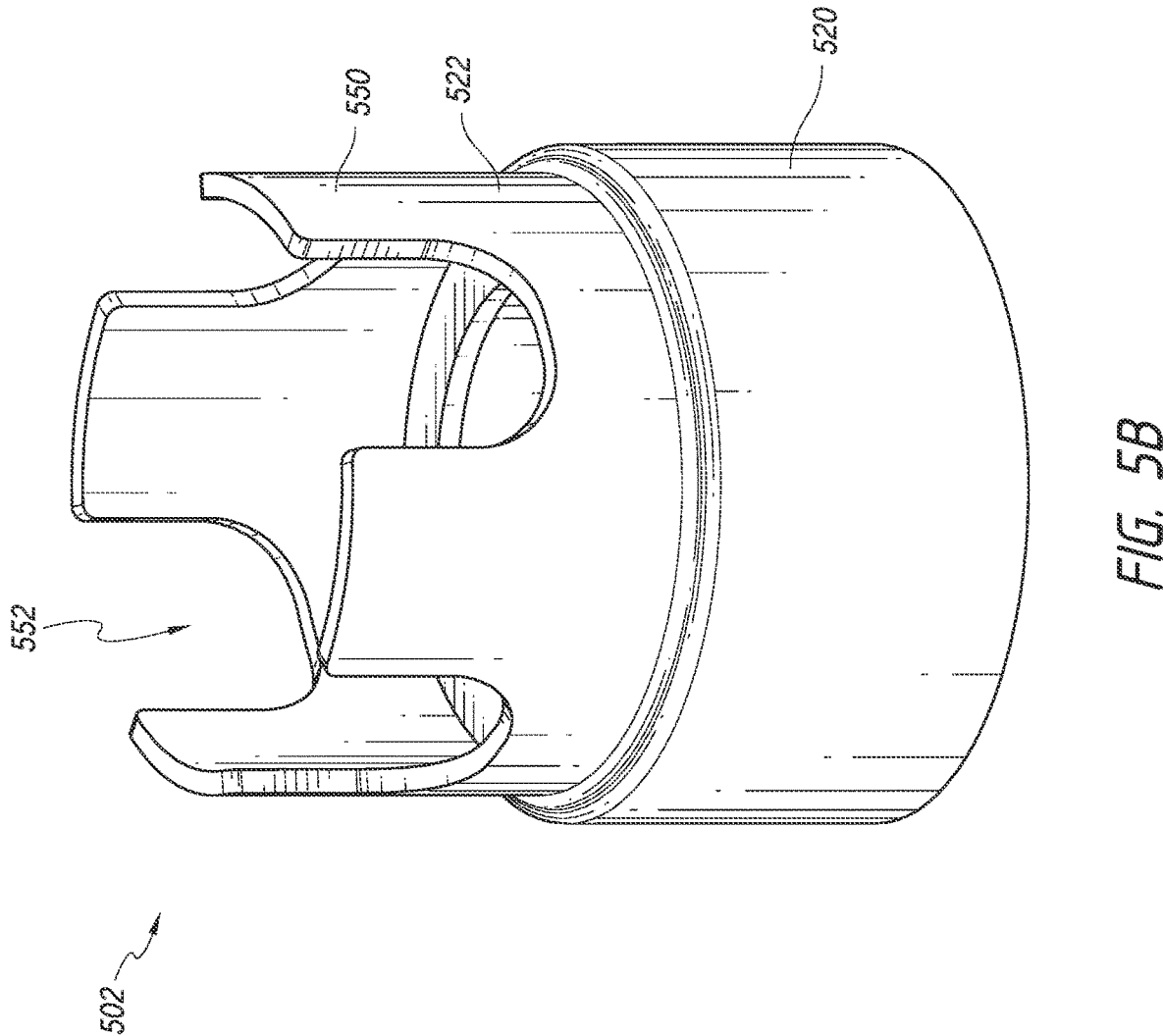
FIG. 5B is a perspective view of the seal carriage of the seal carriage assembly of FIG. 5A, configured in accordance with embodiments of the present technology.

FIG. 5B is a perspective view of the seal carriage 502 of FIG. 5A. Referring to FIG. 5B, the second end portion 522 can further include a socket 552. The socket 552 can be configured to releasably receive one or more seal components, such as the seal assembly 104 on FIG. 5A. In the illustrated embodiment, the socket 552 includes the arms 550.

Figure 5D:
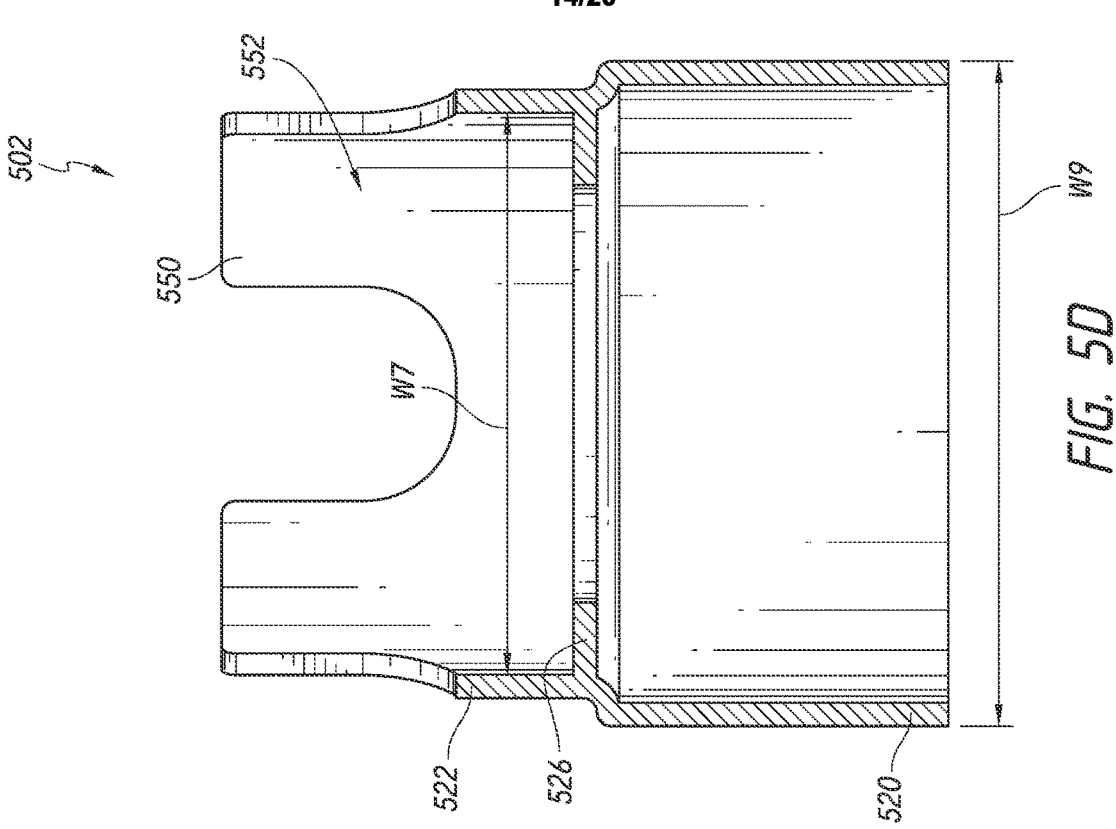
FIG. 5D is a cross-sectional view of the seal carriage assembly of FIG. 5A, taken along the cut-plane 5D-5D of FIG. 5C.
Figure 5C:
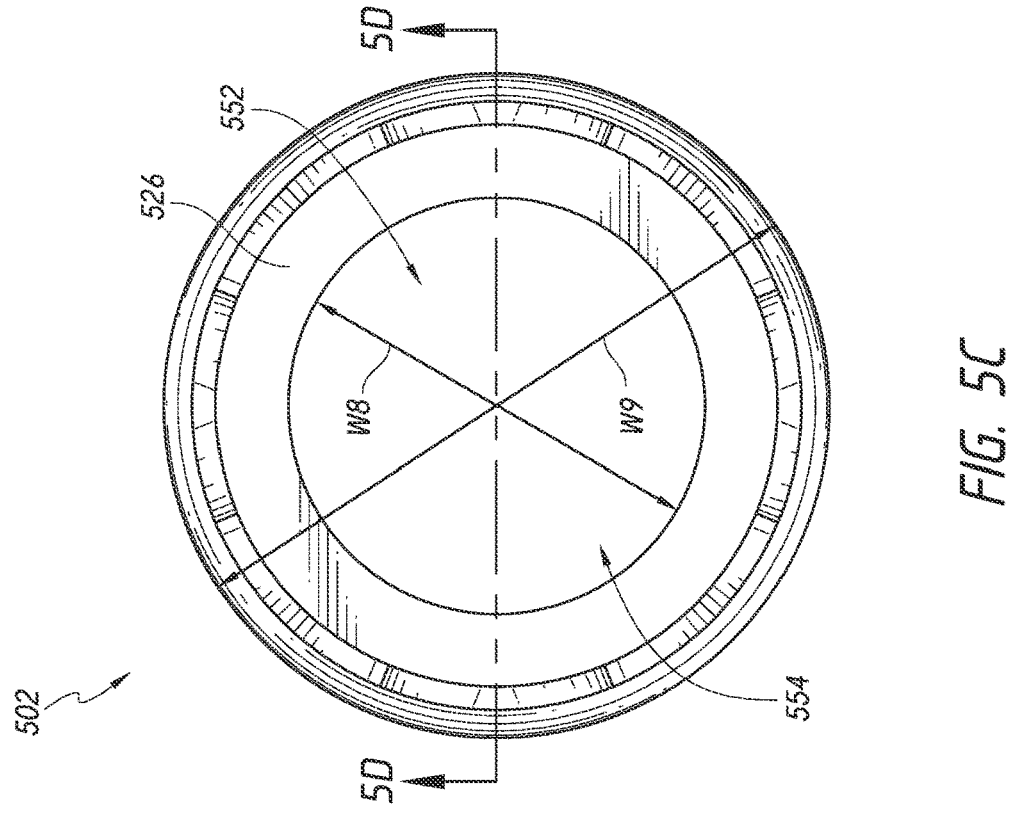
FIG. 5C is a front plan view of the seal carriage assembly of FIG. 5A.
Figure 5E:
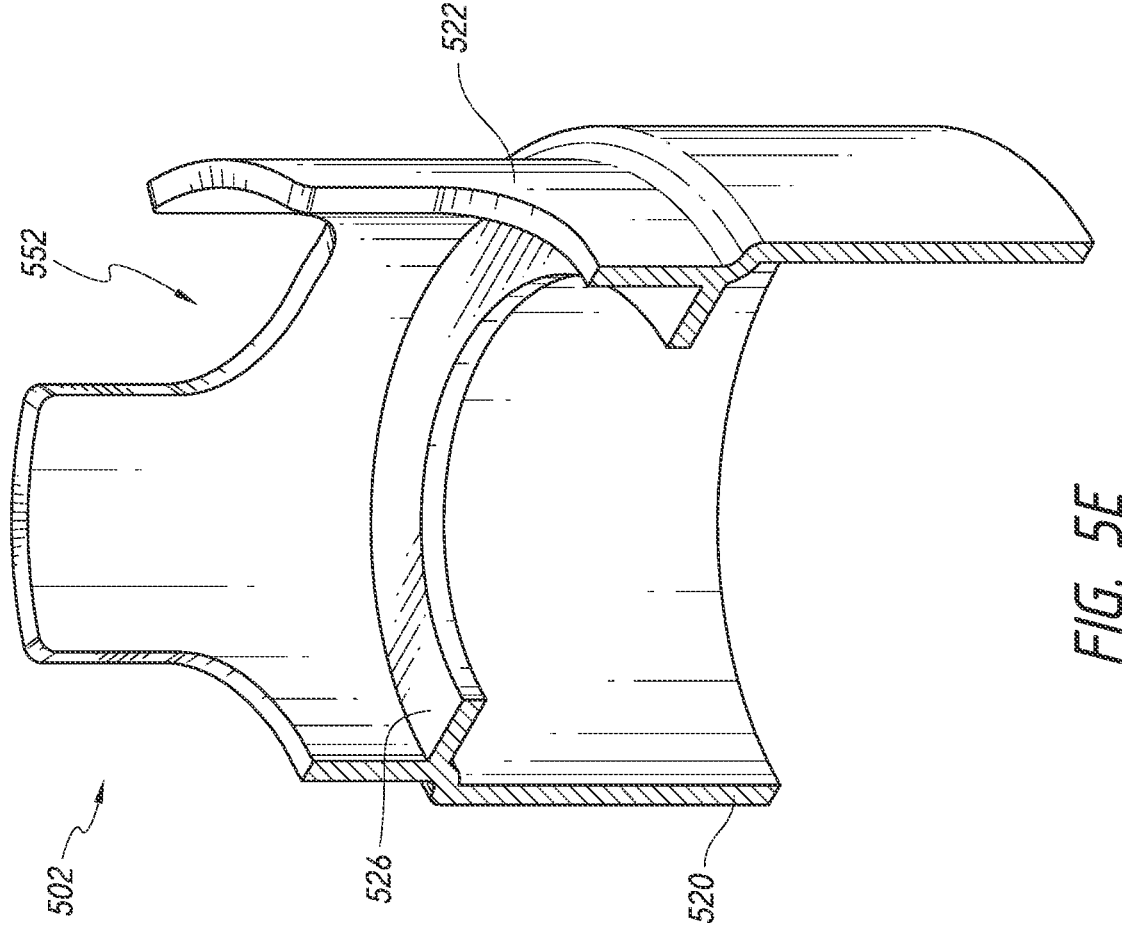
FIG. 5E is a perspective cross-sectional view of the seal carriage assembly of FIG. 5A, taken along the cut-plane 5D-5D of FIG. 5C.

FIG. 5C is a front view of the seal carriage 502 of FIG. 5B. FIG. 5D is a cross-sectional view of the seal carriage 502 of FIG. 5C taken along the line 5D-5D. FIG. 5E is a perspective cross-sectional view of the seal carriage 502 of FIG. 5D. Referring to FIGS. 5C-5E, the seal carriage 502 can further include an abutment or flange 526 positioned radially about the longitudinal axis on an interior surface of the seal carriage 502. The flange 526 can extend at least partially inward (e.g., towards the longitudinal axis), and can have a cross-sectional shape corresponding to the cross-sectional shape of the seal carriage 502. The flange 526 can support the one or more components of seal assembly 104 of FIG. 5A when the seal assembly 104 is place within the socket 552. For example, referring to FIGS. 5D-5E, the flange 526 can prevent the one or more components of the seal assembly 104 of FIG. 5A from moving towards the first end portion 520 relative to the seal carriage 502. In some embodiments, the flange 526 has a uniform radial thickness around an entire circumference of the seal carriage 502. In some embodiments, the radial thickness of the flange 526 varies along the circumference of the seal carriage 502. In still further embodiments, the flange 526 can be discontinuous such that one or more circumferential gaps (e.g., tabs) separate the flange 526 into one, two, or more sections about the circumference of the seal carriage 502.

As best seen in FIG. 5C, the seal carriage 502 can further include an aperture 554. The aperture 554 can be at least partially defined by an inner width of the flange 526. The aperture 554 can have a width W8 and/or cross-sectional shape that corresponds to the plunger 308 (FIGS. 3A-3C). For example, at least some or all of the plunger 308 can pass through the aperture 556 when the plunger 308 is inserted into the socket 552. Passage of the plunger 308 through the aperture 556 can allow the seal assembly 104 to be installed on the plunger 308 as the installation tool 300 is passed over the plunger 308 in the manner described above with respect to FIGS. 3A-3C.

Figure 6A:
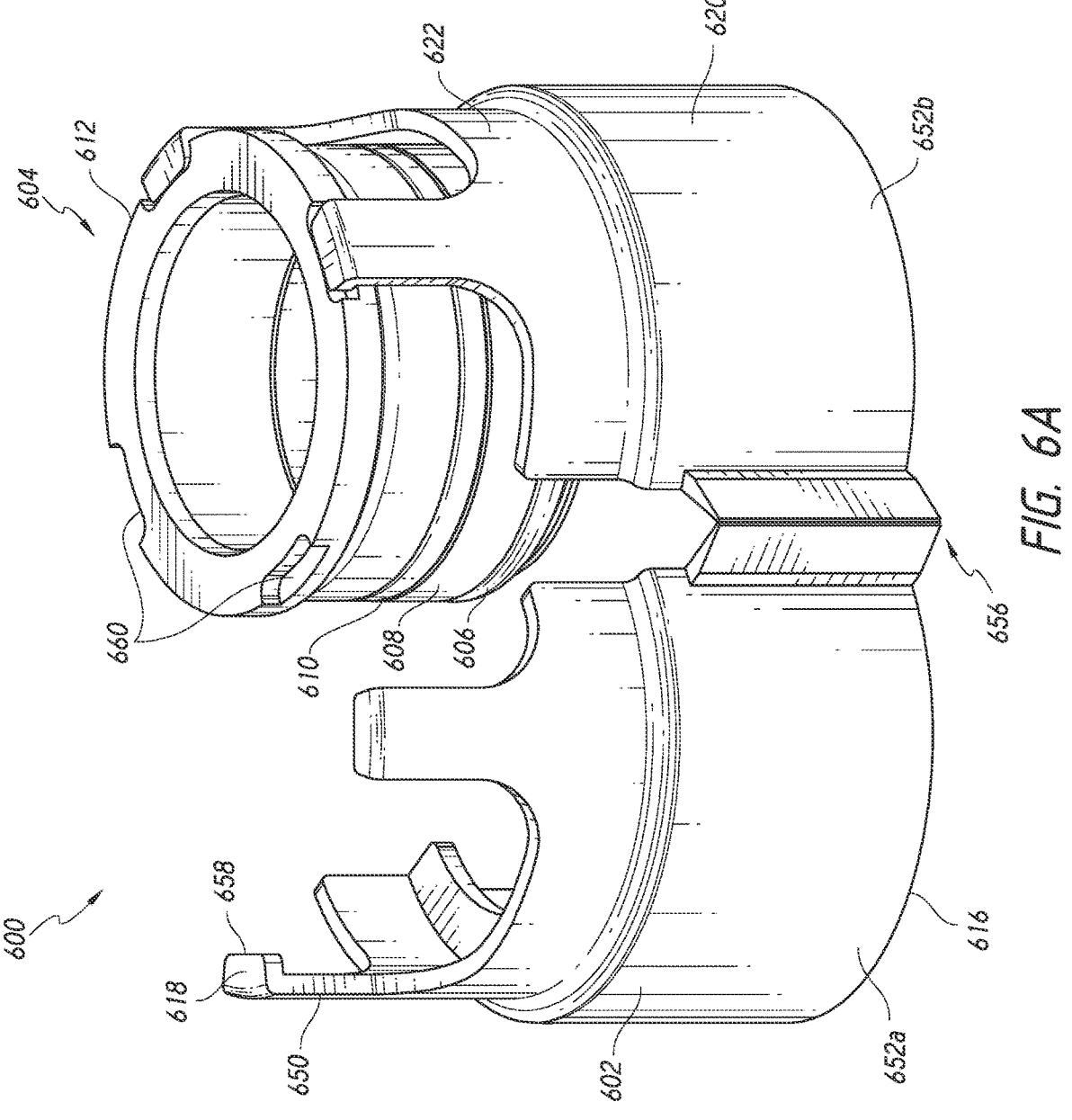
FIG. 6A is a perspective view of another seal carriage assembly, configured in accordance with embodiments of the present technology.

FIG. 6A is a perspective view of a seal carriage assembly 600, configured in accordance with embodiments of the present technology. The components of the seal carriage assembly 600 of FIG. 6A can be generally similar to the components of the seal carriage assembly 500 of FIGS. 5A-5E. Accordingly, like numbers (e.g., flange 526 v. flange 626) are used to identify similar or identical components, and the discussion of the seal carriage assembly 600 of FIG. 6A will be limited to those features that differ from the seal carriage assembly 100 of FIGS. 1A-1D and/or the seal carriage assembly 500 of FIG. 5A. Additionally, any of the features of the seal carriage assembly 600 of FIG. 6A can be combined with each other and/or with the seal carriage assembly 100 of FIGS. 1A-1D and/or the seal carriage assembly 500 of FIG. 5A.

Referring to FIG. 6A, the seal carriage 602 has a first body portion 652a and a second body portion 652b joined by a hinge 656. In the illustrated embodiment, the hinge 656 is positioned on an outer surface of the first end portion 620 of the first and second bodies 652a, 652b. The hinge 656 can be a living hinge, a clamshell hinge, or any other suitable hinge. The hinge 656 can be configured to pivot the first body portion 652a relative to the second body portion 652b and/or pivot the second body portion 652b relative to the first body portion 652a to move the seal carriage 602 from an opened configuration (e.g., FIG. 6A) to a closed configuration (not shown). The hinge 656 can further include a latch 657 (FIG. 6B) configured to lock the seal carriage 602 in the closed configuration. In some embodiments, the latch 657 can be sacrificial such that the latch 657 breaks when the seal carriage 602 moves from the closed configuration to the open configuration. In other embodiments, the latch 657 can be releasable such that the latch 657 can be reused to return the seal carriage 602 from the opened configuration to the closed configuration.

The second end portion 622 can further include a plurality of arms 650 similar to the arms 550 described above with respect to FIGS. 5A-5E. One or more of the arms 650 can have an end catch 658. The end catches 658 can be, for example, flanges extending toward the longitudinal axis of the seal carriage 602 from the second end 618 of the seal carriage 602. Each of the catches 658 can correspond to a recess 660 in one of the components of the seal assembly 604 such that the catches 658 can be releasably received by the corresponding recesses 660. For example, in the illustrated embodiment, the backup ring 612 includes a plurality of recesses 660 corresponding to the catches 658. The catches 658 can prevent one or more of the components of the seal assembly 604 from moving longitudinally (e.g., away from the first end portion 620) relative to the seal carriage 602 when the seal carriage 602 is in the closed configuration. While illustrated as having four arms 650 in FIG. 6A, in other embodiments the seal carriage 602 can include more or fewer arms. For example, the seal carriage 602 can have two, three, five, six, seven, eight, nine, ten, or any other suitable number of arms 650. In some embodiments, the arms 650 extend beyond the seal assembly 604 in a direction parallel to the longitudinal axis. In some such embodiments, the catches 658 retain the seal assembly 604 without a need for recesses on one or more seal components.

Figure 6B:
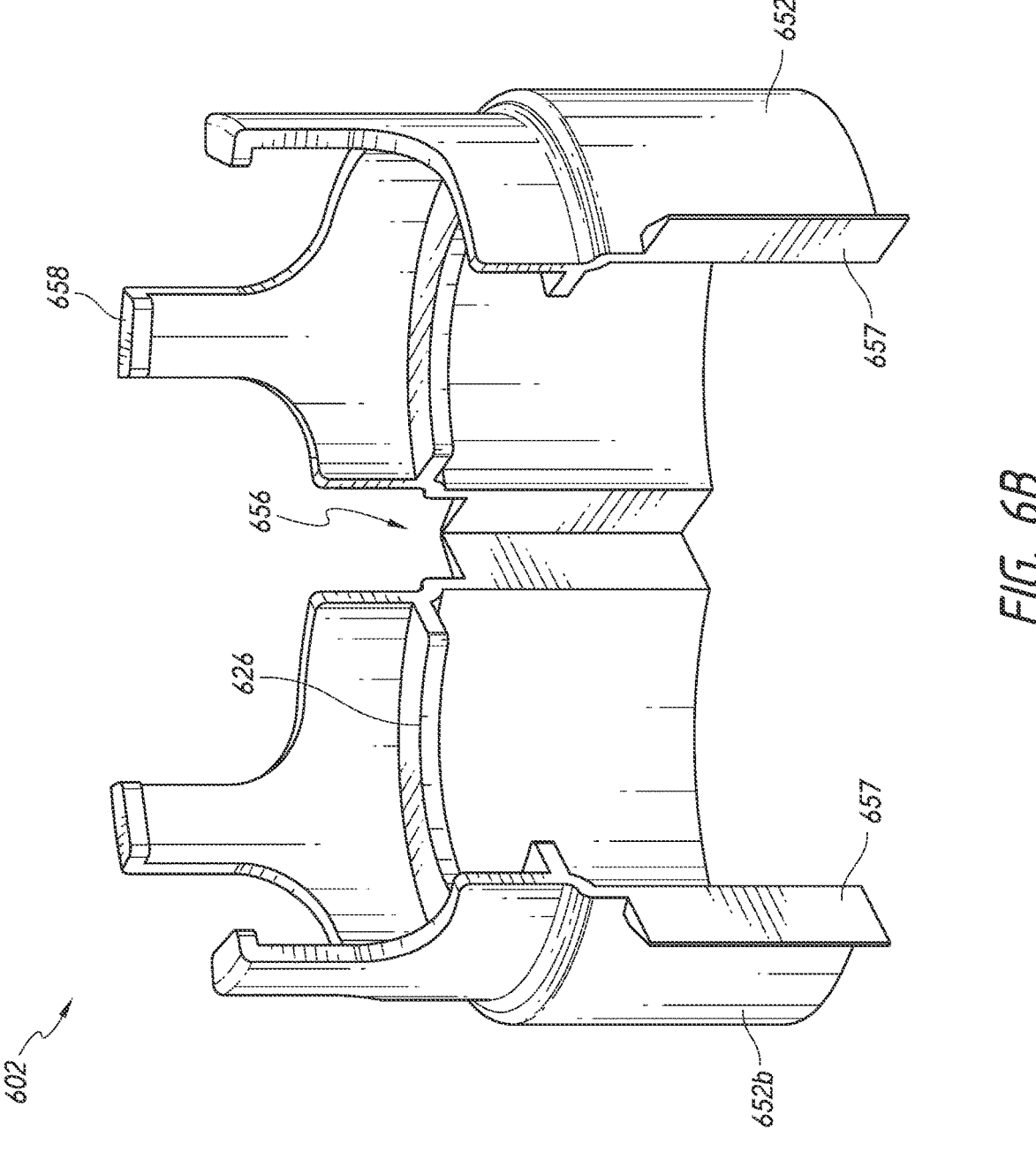
FIG. 6B is a perspective view of the seal carriage of the seal carriage assembly of FIG. 6A, configured in accordance with embodiments of the present technology and in an opened configuration.

FIG. 6B is a perspective view of the seal carriage 602 of FIG. 6A. Referring to FIG. 6B, the first body portion 652a can be structurally similar or identical to the second body portion 652b. For example, in some embodiments, the second body portion 652b can mirror the first body portion 652a about a plane coplanar with the longitudinal axis of the seal carriage 602 and bisecting the hinge 656.

Figure 6C:
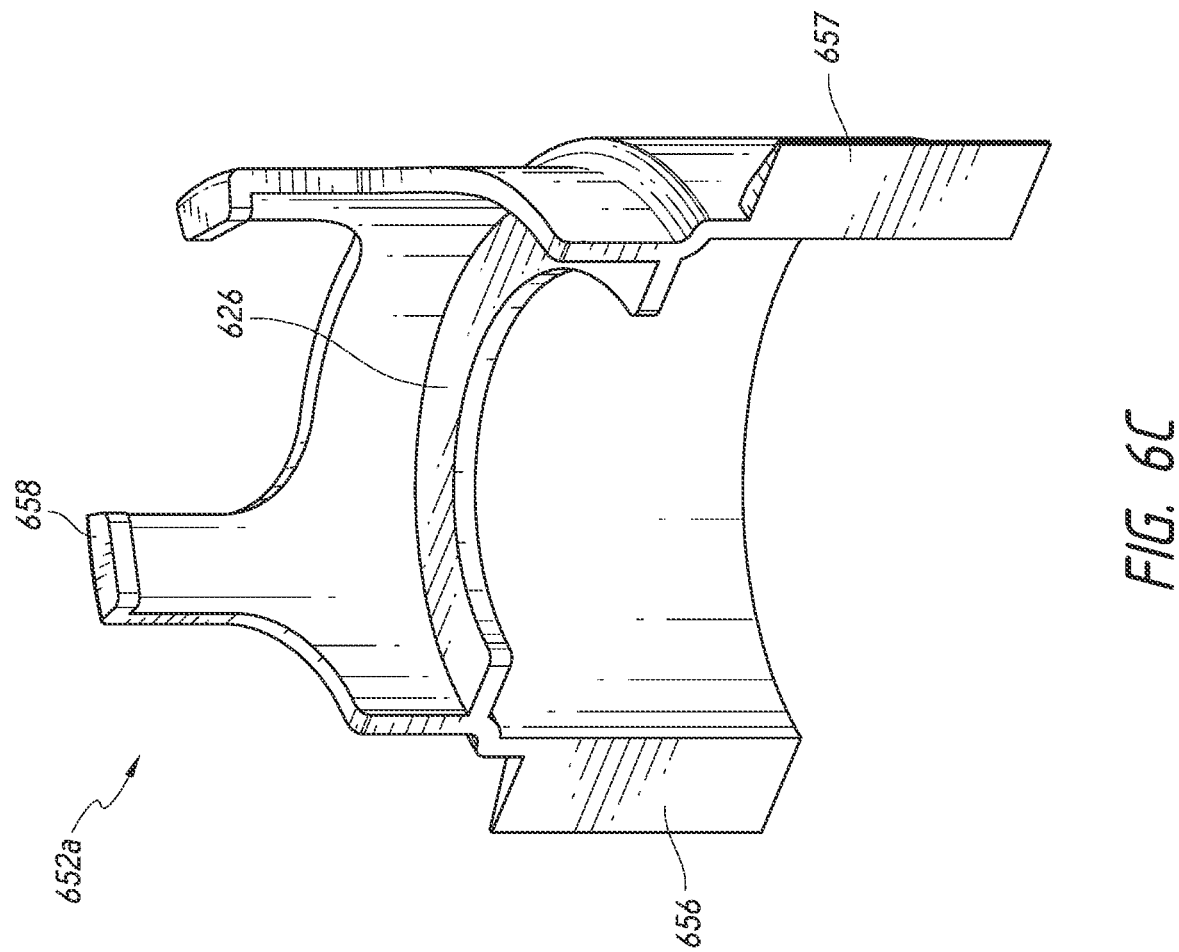
FIG. 6C is a perspective view of a first portion of the seal carriage of FIG. 6B.

FIG. 6C is a perspective view of the first body portion 652a of the seal carriage 602 of FIG. 6B. Referring to FIGS. 6B-6C, the seal carriage 602 can further include an abutment or flange 626. The flange 626 can be configured similarly to and/or generally the same as the flange 526 of FIGS. 5C-5E when the seal carriage 602 is in the closed configuration. The flange 626 can prevent the one or more components of the seal assembly 604 of FIG. 6A from moving longitudinally (e.g., towards the first end portion 620) relative to the seal carriage 602. In the illustrated embodiment, the flange 626 and the catches 658 can contact opposite sides of the one or more components of the seal assembly 604 of FIG. 6A, such that the one or more components of the seal assembly 604 can be secured at least partially between the flange 626 and the catches 658. This can advantageously help maintain the one or more components of the seal assembly 604 in alignment with the seal carriage 602 and/or each other.

During installation, the seal carriage 602 can operate in a manner similar to or identical to the seal carriage 502 describe above. Installing the one or more components of the seal assembly 604 using the seal carriage 602 can include the additional step of opening the seal carriage 602 to remove the seal carriage 602 from the plunger 308 and/or from the seal assembly 604.

Figure 7:
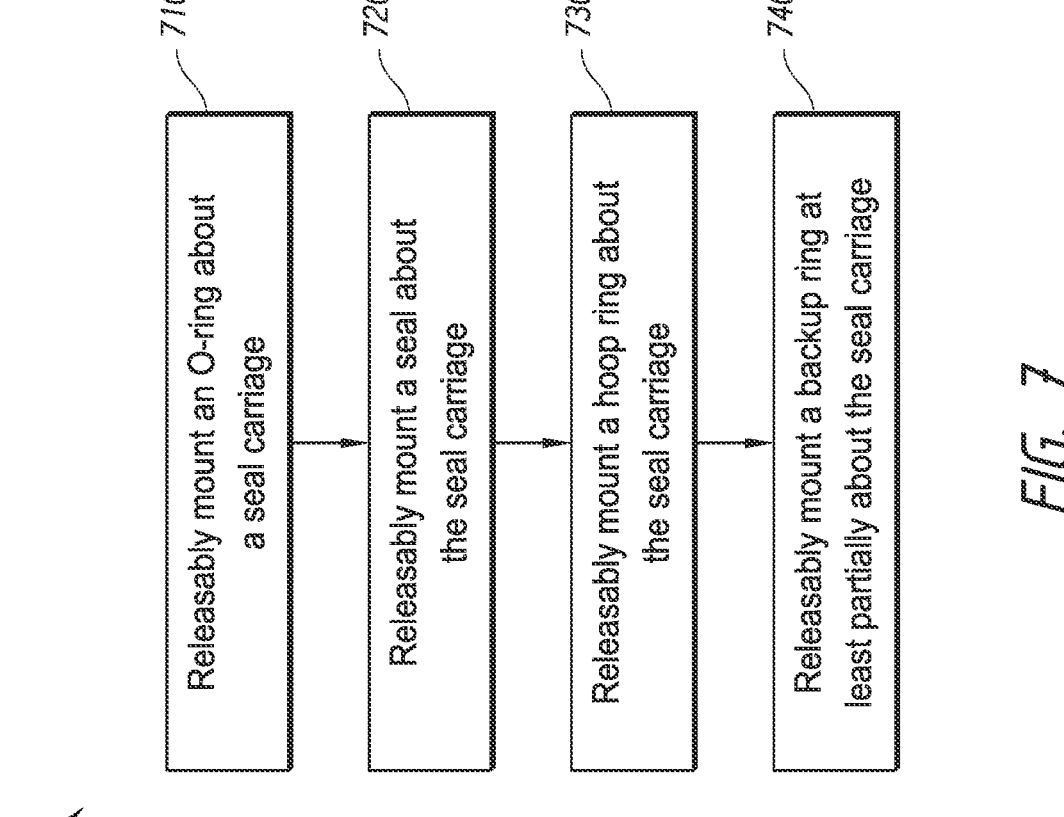
FIG. 7 is a flow diagram of a method of assembling a seal carriage assembly, in accordance with embodiments of the present technology.

FIG. 7 is a flow diagram of a method 700 for assembling a seal carriage assembly using a seal carriage, in accordance with embodiments of the present technology. The method 700 can be used with any of the seal carriages discussed previously.

At block 710, the method 700 includes releasably coupling an O-ring in a seal carriage. The O-ring can be positioned between the first and second ends of the seal carriage. In some embodiments, mounting the O-ring can include applying a lubricant to the O-ring. The lubricant can be a high-vacuum grease for use with a liquid jet cutting system, such as Dow-Corning® high-vacuum grease or other appropriate greases. The lubricant can be applied by skilled manufacturers prior to shipment, which can reduce the risk of applying too much, too little, and/or uneven lubricant to the O-ring. Lubricant can also be applied for specific applications. For example, certain installation sites (e.g., machines or components of machines) may require different lubricants or amount of lubricant compared to other installation sites.

At block 720, the method 700 includes releasably coupling a seal to the seal carriage. The seal can be at least partially between the O-ring and the second end of the seal carriage. In some embodiments, the O-ring can be positioned at least partially about a portion of the seal, such that the seal can support the O-ring. The seal can contact an abutment on a surface of the seal carriage to prevent the seal from moving towards the first end of the seal carriage. For example, in some embodiments the outer surface of the seal carriage can include an abutment, and the seal can at least partially contact the abutment. In other embodiments, the seal carriage can include an inner flange, and the seal can at least partially contact the flange. In some embodiments, the O-ring is mounted to the seal prior to coupling the O-ring and seal to the seal carriage.

At block 730, the method 700 includes releasably mounting a hoop ring about the seal carriage. The hoop ring can be positioned at least partially between the seal and the second end of the seal carriage.

At block 740, the method 700 includes releasably mounting a backup ring at least partially about the seal carriage. The backup ring can be positioned on a side of the hoop ring opposite the first end. In some embodiments, the backup ring can have a first region that is positioned between the hoop ring and the second end of the seal carriage, and a second region that extends away from second end of the seal carriage. In some embodiments, the method includes shrink-wrapping or otherwise sealing the assembled seal carriage assembly in a container (e.g., disposable packaging) for shipment.

The method 700 of assembling the seal carriage assembly can be performed by skilled employees at a manufacturing site. This can reduce the risk that the seal components are assembled in an incorrect order or orientation. Proper alignment/orientation of the seal components can allow for quick installation of the seal components by end users, as the end users need not research or otherwise look up how to orient the various seal components on the plunger or other installation site.

Figure 8:
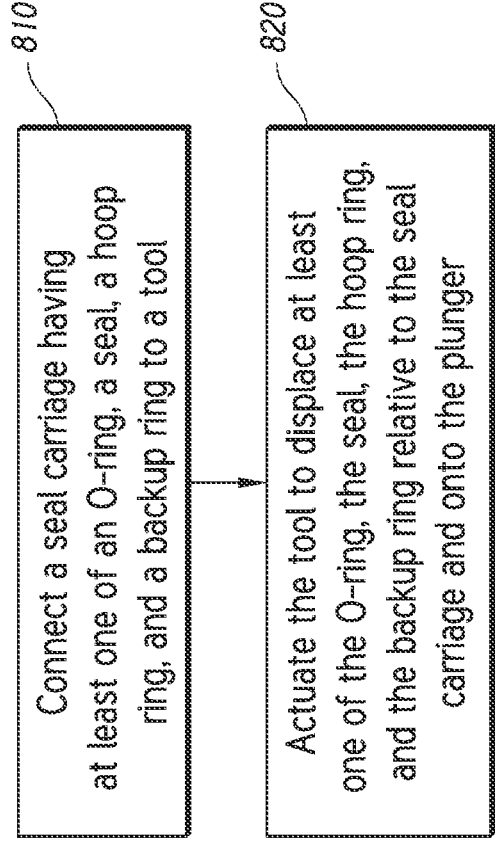
FIG. 8 is a flow diagram of a method installing seal components from a seal carriage assembly, in accordance with embodiments of the present technology.

FIG. 8 is a flow diagram of a method 800 for using a tool to install seal components onto a plunger of a liquid jet cutting system using a seal carriage, in accordance with embodiments of the present technology. The method 800 can be used with any of the seal carriages discussed previously.

At block 810, the method 800 includes connecting a seal carriage to a tool. Specific methods of connecting seal carriages to tools are described above with respect to the seal carriages 102, 402, 502, 602. The seal carriage can be releasably coupled to at least one of an O-ring, a seal, a hoop ring, and/or a backup ring. The tool can be the installation tool 300 of FIGS. 3A-3C, or any other suitable tool. The tool can have a generally circular cross-sectional shape, and can include an opening configured to receive at least part of a first end portion of the seal carriage.

At block 820, the method 800 includes actuating the tool to mount at least one of the O-ring, the seal, the hoop ring, and/or the backup ring onto the plunger. The plunger can be the plunger 308 of FIGS. 3A-3C. In some embodiments, displacing the seal carriage can cause at least one of the O-ring, the seal, the hoop ring, and/or the backup ring to mount to the plunger.

Some examples of the disclosed technology are further described below.

Example 1. A disposable seal carriage for use with a liquid jet cutting system, the disposable seal carriage comprising:
    a body having—
        a first end portion, a longitudinal axis, and a second end portion opposite the first end portion along the longitudinal axis, wherein—
        the first end portion has a first outer width as measured perpendicular to the longitudinal axis,
        the second end portion has a second outer width as measured perpendicular to the longitudinal axis, and
        the first outer width is greater than the second outer width;
    a flexible region extending through at least a portion of the body along a portion of the longitudinal axis; and
    a plurality of exterior projections positioned between the first and second end portions.

Example 2. The disposable seal carriage of example 1 wherein the second end portion tapers outwardly toward the first end portion with respect to the longitudinal axis.

Example 3. The disposable seal carriage of example 1 wherein the body further includes an outer step positioned about the longitudinal axis and between the first end portion and the second end portion.

Example 4. The disposable seal carriage of example 3, wherein: the first end portion has a first radial stiffness, as measured perpendicular to the longitudinal axis; and
    the second end portion has a second radial stiffness as measured perpendicular to the longitudinal axis, wherein the second radial stiffness is greater than the first radial stiffness.

Example 5. The disposable seal carriage of example 3, wherein the first end portion has:
    a first region having a first radial stiffness, as measured perpendicular to the longitudinal axis; and
    a second region between the first region and the step, the second region having a second radial stiffness as measured perpendicular to the longitudinal axis, wherein the second radial stiffness is greater than the first radial stiffness.

Example 6. The disposable seal carriage of example 1 wherein at least a portion of the body is hollow.

Example 7. The disposable seal carriage of example 6 wherein the second end portion is hollow and further includes a flange extending circumferentially inward towards the longitudinal axis.

Example 8. The disposable seal carriage of example 1 wherein the second end portion is configured to receive at least one of an O-ring, a seal assembly, a hoop ring, and a backup ring.

Example 9. The disposable seal carriage of example 1 wherein the body has a cross-section perpendicular to the longitudinal axis that is substantially circular.

Example 10. The disposable seal carriage of example 1 wherein the flexible region is a slot.

Example 11. A seal assembly for use with a liquid jet cutting system, the seal assembly comprising:

a disposable seal carriage having a first end portion, a longitudinal axis, and a second end portion spaced from the first end portion along the longitudinal axis;

a backup ring positioned substantially about the second end portion;

a hoop ring positioned substantially about the disposable seal carriage between the first end portion and the backup ring;

a seal positioned substantially about the disposable seal assembly carriage between the first end portion and the hoop ring; and an O-ring positioned substantially about a portion of the seal.

Example 12. The seal assembly of example 10 wherein the disposable seal carriage further includes— a flexible region disposed generally parallel to the longitudinal axis and through at least a portion of the disposable seal carriage between the first and second end portions, and an abutment positioned between the first and second end portions and configured to contact the seal in a direction parallel to the longitudinal axis of the carriage.

Example 13. The seal assembly of example 12 wherein the flexible region is a slot.

Example 14. The seal assembly of example 10 wherein the backup ring, the hoop ring, the seal, and the O-ring are configured to be releasably attached to the second end portion of the disposable seal assembly.

Example 15. The seal assembly of example 14 wherein the second end portion of the disposable seal carriage includes:

a first region having a first radial width as measured perpendicular to the longitudinal axis; and a second region between the first region and the first end portion, the second region having a second radial width as measured perpendicular to the longitudinal axis; wherein— the first radial width is greater than the second radial width when the backup ring, hoop ring, seal, and O-ring are releasably attached to the disposable seal carriage, and the first radial width is generally equal to the second radial width when the backup ring, hoop ring, seal, and O-ring are released from the disposable seal carriage.

Example 16. The seal assembly of example 15 wherein an outer radial width of the first region is greater than an outer radial width of the second region, as measured perpendicular to the longitudinal axis.

Example 17. The seal assembly of example 16 wherein the maximum radial width of the first region is less than a maximum radial width of any of the backup ring, hoop ring, seal, and O-ring when the backup ring, hoop ring, seal, and O-ring are releasably attached to the disposable seal carriage.

Example 18. A disposable seal carriage for use with a liquid jet cutting system, the disposable seal carriage comprising:

a body including— a first end portion having a first stiffness, a longitudinal axis; and a second end portion spaced from the first end portion along the longitudinal axis and having a second stiffness, the second stiffness being greater than the first stiffness, and a first lateral boundary and a second lateral boundary facing the first lateral boundary;

wherein a first width between the first and second lateral boundaries at the first end portion, as measured perpendicular to the plane, and wherein a second width between the first and second lateral boundaries at the second end portion, the first width being greater than the second width.

Example 19. The disposable seal carriage of example 18 wherein the first lateral boundary has a slope that is non-linear with respect to the plane.

Example 20. The disposable seal carriage of example 18 wherein the second end portion comprises an outer surface configured to releasably receive at least one of an O-ring, a seal assembly, a hoop ring, or a backup ring.

Example 21. The disposable seal carriage of example 18, wherein the first lateral boundary is a mirror image of the second lateral boundary across a plane that is coplanar with the longitudinal axis.

Example 22. A method of creating a seal assembly for use in a liquid jet cutting system, the method comprising:

releasably mounting an O-ring about a disposable seal installation carriage having a first end and a second end;

releasably mounting a seal about the disposable seal installation carriage and between the O-ring and the second end;

releasably mounting a hoop ring about the disposable seal installation carriage and between the seal and the second end; and releasably mounting a backup ring at least partially about the disposable seal assembly installation carriage on a side of the hoop ring opposite the first end.

Example 23. The method of example 22, further comprising seating the disposable seal installation carriage on a plunger of a liquid jet cutting system.

Example 24. The method of example 23, further comprising actuating an installation tool to displace the disposable seal installation carriage relative to at least one of the O-ring, the seal, the hoop ring, and the backup ring.

Example 25. The method of example 24 wherein actuating the installation element further includes releasably mounting at least one of the high-pressure O-ring, the high-pressure seal, the hoop ring, or the backup ring to the plunger.

Example 26. The method of example 22, further comprising:

applying a lubricant to the O-ring seal;

positioning the O-ring about a portion of the seal such that the seal supports the O-ring; and positioning the seal relative to the disposable seal installation carriage to contact an abutment on an outer surface of the disposable seal installation carriage.

Example 27. A seal assembly for use with a liquid jet cutting system, the seal assembly comprising:

a disposable seal carriage having a first end portion, a longitudinal axis, and a second end portion spaced from the first end portion along the longitudinal axis;

a backup ring connected to the second end portion;

a hoop ring positioned between the first end portion and the backup ring;

a seal positioned connected to the disposable seal assembly carriage between the first end portion and the hoop ring; and an O-ring connected to a portion of the seal.

References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

As one of ordinary skill in the art will appreciate, embodiments of the seal carriages described herein can allow for more reliable shipping of the components of the seal assemblies. Additionally, the designs described herein can reduce the risk of incorrectly installing the seals on plungers or other components of liquid jet cutting systems.

The above Detailed Description of examples and embodiments of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes are presented in a given order, alternative implementations may perform routines having steps in a different order, and some processes may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the technology have been described herein for purposes of illustration, but that various modifications may be made without deviating from the spirit and scope of the various embodiments of the technology. Further, while various advantages associated with certain embodiments of the technology have been described above in the context of those embodiments, other embodiments may also exhibit such advantages, and not all embodiments need necessarily exhibit such advantages to fall within the scope of the technology. Accordingly, the technology is not limited, except as by the appended claims. Moreover, although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

We claim:

1. A seal assembly for use with a liquid jet cutting system, the seal assembly comprising:

a disposable seal carriage having a first end portion, a longitudinal axis, and a second end portion, the second end portion defining an end surface of the disposable seal carriage spaced from the first end portion along the longitudinal axis;

a backup ring positioned substantially about the second end portion, wherein at least a portion of the backup ring extends away from the disposable seal carriage and is spaced apart from the end surface in a direction parallel to the longitudinal axis;

a hoop ring positioned substantially about the disposable seal carriage between the first end portion and the backup ring;

a seal positioned substantially about the disposable seal carriage between the first end portion and the hoop ring; and an O-ring positioned substantially about a portion of the seal.

2. The seal assembly of claim 1 wherein the disposable seal carriage further includes a flexible region disposed generally parallel to the longitudinal axis and through at least a portion of the disposable seal carriage between the first and second end portions, and an abutment positioned between the first and second end portions and configured to contact the seal in a direction parallel to the longitudinal axis of the disposable seal carriage.

3. The seal assembly of claim 2 wherein the flexible region is a slot.

4. The seal assembly of claim 1 wherein the backup ring, the hoop ring, the seal, and the O-ring are configured to be releasably attached to the second end portion of the disposable seal carriage.

5. The seal assembly of claim 4 wherein the second end portion of the disposable seal carriage includes:

a first region having a first radial width as measured perpendicular to the longitudinal axis; and a second region between the first region and the first end portion, the second region having a second radial width as measured perpendicular to the longitudinal axis;

wherein— the first radial width is greater than the second radial width when the backup ring, the hoop ring, the seal, and the O-ring are releasably attached to the disposable seal carriage, and the first radial width is generally equal to the second radial width when the backup ring, the hoop ring, the seal, and the O-ring are released from the disposable seal carriage.

6. The seal assembly of claim 5 wherein an outer radial width of the first region is greater than an outer radial width of the second region, as measured perpendicular to the longitudinal axis.

7. The seal assembly of claim 6 wherein a maximum radial width of the first region is less than a maximum radial width of any of the backup ring, the hoop ring, the seal, and the O-ring when the backup ring, the hoop ring, the seal, and the O-ring are releasably attached to the disposable seal carriage.

8. The seal assembly of claim 1 wherein a portion of the seal is positioned between the O-ring and the disposable seal carriage.

9. A method of creating a seal assembly for use in a liquid jet cutting system, the method comprising:

releasably mounting an O-ring about a disposable seal carriage, the disposable seal carriage having a first end portion, a longitudinal axis, and a second end portion spaced from the first end portion along the longitudinal axis;

releasably mounting a seal about the disposable seal carriage;

positioning the O-ring substantially about a portion of the seal;

releasably mounting a hoop ring about the disposable seal carriage such that the seal is positioned between the first end portion and the hoop ring; and releasably mounting a backup ring substantially about the second end portion of the disposable seal carriage on a side of the hoop ring opposite the first end portion such that the hoop ring is positioned between the first end portion and the backup ring and at least a portion of the backup ring extends away from the disposable seal carriage in a direction parallel to the longitudinal axis.

10. The method of claim 9, further comprising seating the disposable seal carriage on a plunger of a liquid jet cutting system.

11. The method of claim 10, further comprising actuating an installation tool to displace the disposable seal carriage relative to at least one of the O-ring, the seal, the hoop ring, and the backup ring.

12. The method of claim 11 wherein actuating the installation tool further includes releasably mounting at least one of the O-ring, the seal, the hoop ring, or the backup ring to the plunger.

13. The method of claim 9, wherein:

positioning the O-ring substantially about the portion of the seal includes— applying a lubricant to the O-ring; and moving the O-ring onto the portion of the seal such that the seal supports the O-ring; and the method further comprises positioning the seal relative to the disposable seal carriage to contact an abutment on an outer surface of the disposable seal carriage.

14. A seal assembly for use with a liquid jet cutting system, the seal assembly comprising:

a disposable seal carriage having a first end portion, a longitudinal axis, and a second end portion, the second end portion defining an end surface of the disposable seal carriage spaced from the first end portion along the longitudinal axis;

a backup ring connected to the second end portion, wherein at least a portion of the backup ring extends away from the disposable seal carriage and is spaced apart from the end surface in a direction parallel to the longitudinal axis;

a hoop ring positioned between the first end portion and the backup ring;

a seal connected to the disposable seal carriage between the first end portion and the hoop ring; and an O-ring connected to a portion of the seal.

15. The seal assembly of claim 14 wherein the second end portion of the disposable seal carriage includes:

a first region having a first radial width as measured perpendicular to the longitudinal axis; and a second region between the first region and the first end portion, the second region having a second radial width as measured perpendicular to the longitudinal axis;

wherein— the first radial width is greater than the second radial width when the backup ring, the hoop ring, seal, and the O-ring are connected to the disposable seal carriage, and the first radial width is generally equal to the second radial width when the backup ring, the hoop ring, seal, and the O-ring are removed from the disposable seal carriage.

16. The seal assembly of claim 15 wherein an outer radial width of the first region is greater than an outer radial width of the second region, as measured perpendicular to the longitudinal axis.

17. The seal assembly of claim 16 wherein the maximum radial width of the first region is less than a maximum radial width of any of the backup ring, hoop ring, seal, and O-ring when the backup ring, hoop ring, seal, and O-ring are releasably attached to the disposable seal carriage.

18. The seal assembly of claim 14 wherein a portion of the seal is positioned between the O-ring and the disposable seal carriage.

\* \* \* \* \*